US009684308B2

(12) United States Patent
Dahm et al.

(10) Patent No.: US 9,684,308 B2
(45) Date of Patent: Jun. 20, 2017

(54) TRANSPORT MODE CONVERSION

(71) Applicant: Wirtgen GmbH, Windhagen (DE)

(72) Inventors: Martin Dahm, Gieleroth (DE);
Christian Liss, Meckenheim (DE);
Martin Lenz, Grossmaischeid (DE);
Benjamin Pock, Hachenburg (DE)

(73) Assignee: Wirtgen GmbH (DE)

( * ) Notice: Subject to any disclaimer, the term of this patent is extended or adjusted under 35 U.S.C. 154(b) by 66 days.

(21) Appl. No.: 14/540,198

(22) Filed: Nov. 13, 2014

(65) Prior Publication Data

US 2016/0137242 A1    May 19, 2016

(51) Int. Cl.
| | |
|---|---|
| G05D 1/08 | (2006.01) |
| E01C 19/42 | (2006.01) |
| E01C 19/48 | (2006.01) |
| B62D 7/15 | (2006.01) |
| B62D 11/20 | (2006.01) |
| B62D 55/065 | (2006.01) |
| B62D 55/084 | (2006.01) |

(52) U.S. Cl.
CPC ......... *G05D 1/0891* (2013.01); *B62D 7/1509* (2013.01); *B62D 11/20* (2013.01); *B62D 55/065* (2013.01); *B62D 55/084* (2013.01); *E01C 19/42* (2013.01); *E01C 19/48* (2013.01)

(58) Field of Classification Search
CPC .... G05D 1/0891; B62D 7/1509; B62D 11/20; B62D 55/065; B62D 55/084; E01C 19/42
See application file for complete search history.

(56) References Cited

U.S. PATENT DOCUMENTS

| | | |
|---|---|---|
| 3,664,448 A | 5/1972 | Hudis |
| 3,792,745 A | 2/1974 | Files |
| 3,970,405 A | 7/1976 | Swisher, Jr. et al. |
| 4,029,165 A | 6/1977 | Miller et al. |
| 4,360,293 A | 11/1982 | Wade |

(Continued)

FOREIGN PATENT DOCUMENTS

| | | |
|---|---|---|
| DE | 19814052 A1 | 10/1999 |
| EP | 0893539 A1 | 1/1999 |

(Continued)

OTHER PUBLICATIONS

European Search Report in corresponding European Patent Application No. EP 15 15 3919, dated Mar. 30, 2016, 5 pp. (not prior art).

(Continued)

*Primary Examiner* — Kevin Hurley
*Assistant Examiner* — Marlon A Arce
(74) *Attorney, Agent, or Firm* — Lucian Wayne Beavers; Patterson Intellectual Property Law, PC

(57) ABSTRACT

A self-propelled paving machine includes a plurality of swing legs, each swing leg being supported from a ground surface by an associated crawler track steerably connected to an outer end of its associated swing leg. The machine may be re-oriented from a paving mode to a transport mode by driving the ground engaging units to rotate the frame substantially in place on the ground through a re-orientation angle of the frame relative to the ground, and as the frame is rotating, pivoting one or more of the swing legs from a paving position relative to the frame, to a transport position relative to the frame.

26 Claims, 21 Drawing Sheets

(56) References Cited

U.S. PATENT DOCUMENTS

| | | | |
|---|---|---|---|
| 4,789,266 A * | 12/1988 | Clarke, Jr. | E01C 19/187 |
| | | | 404/104 |
| 5,590,977 A | 1/1997 | Guntert et al. | |
| 6,106,073 A | 8/2000 | Simons et al. | |
| 6,390,728 B1 | 5/2002 | Casters | |
| 6,471,442 B1 | 10/2002 | Deeb et al. | |
| 6,481,923 B1 | 11/2002 | Casters | |
| 6,692,185 B2 | 2/2004 | Colvard | |
| 6,773,203 B2 | 8/2004 | Casters | |
| 6,872,028 B2 | 3/2005 | Aeschlimann et al. | |
| 6,890,123 B2 | 5/2005 | Piccoli | |
| 7,287,931 B2 | 10/2007 | Anibaldi et al. | |
| 7,523,995 B2 | 4/2009 | Rio et al. | |
| 7,942,604 B2 | 5/2011 | Willis et al. | |
| 8,118,518 B2 | 2/2012 | Guntert, Jr. et al. | |
| 8,459,898 B2 | 6/2013 | Guntert, Jr. et al. | |
| 9,388,538 B2 * | 7/2016 | Dahm | E01C 19/4886 |
| 9,388,539 B2 * | 7/2016 | Dahm | E01C 19/4886 |
| 2003/0180092 A1 | 9/2003 | Piccoli | |
| 2005/0249554 A1 | 11/2005 | Anibaldi et al. | |
| 2011/0194898 A1 | 8/2011 | Guntert, Jr. et al. | |
| 2011/0236129 A1 * | 9/2011 | Guntert, Jr. | E01C 19/42 |
| | | | 404/72 |
| 2014/0054950 A1 | 2/2014 | Berning et al. | |
| 2015/0354148 A1 * | 12/2015 | Dahm | E01C 19/004 |
| | | | 404/84.05 |

FOREIGN PATENT DOCUMENTS

| | | |
|---|---|---|
| EP | 1596006 A1 | 11/2005 |
| WO | 2008042244 A2 | 4/2008 |

OTHER PUBLICATIONS

Co-pending U.S. Appl. No. 14/299,793 to Dahm et al., entitled "Frame Width Adjustment By Steering", filed Jun. 9, 2014, 55 pp. (not prior art).

Co-pending U.S. Appl. No. 14/299,911 to Dahm et al., entitled "Selective Clamping Of Chassis", filed Jun. 9, 2014, 55 pp. (not prior art).

Co-pending U.S. Appl. No. 14/299,875 to Dahm et al., entitled "Swing Over Steering", filed Jun. 9, 2014, 55 pp. (not prior art).

EPO Search report dated Oct. 19, 2015 in European App. No. 15153905.3-1604 corresponding to U.S. Appl. No. 14/299,875 (not prior art), 5 pages.

EPO Search report dated Oct. 19, 2015 in European App. No. 15153903.8-1604 corresponding to U.S. Appl. No. 14/299,911 (not prior art), 5 pages.

EPO Search report dated Oct. 19, 2015 in European App. No. 15153955.8-1604 corresponding to U.S. Appl. No. 14/299,893 (not prior art), 3 pages.

* cited by examiner

TRANSPORT MODE CONVERSION

BACKGROUND OF THE INVENTION

1. Field of the Invention

The present invention relates to methods and apparatus for operating self-propelled construction machines, and more particularly, but not by way of limitation, to methods and apparatus for operating slipform paving machines.

2. Description of the Prior Art

One known arrangement for a self-propelled construction machine includes a generally rectangular machine frame having a swing leg mounted at each corner of the frame and having a crawler track mounted at the free end of each swing leg. The crawler tracks provide the motive force for the construction machine. The mounting of the crawler tracks on the swing legs allows the crawler tracks to be repositioned in a horizontal plane relative to the machine frame for various reasons. For example, a slipform paving machine utilizing such construction may need to spread the forward extending swing legs in order to make room for a paving kit or other equipment supported from the machine frame. Also, it may be desirable during operation of the machine to relocate one or more of the swing legs and its associated crawler track to avoid obstacles. Also, the swing legs allow the crawler tracks to be repositioned for transport of the construction machine.

Various systems have been proposed for repositioning of the swing legs relative to the machine frame for transport of the construction machine.

One system set forth in Swisher U.S. Pat. No. 3,970,405 provides that each track is individually raised off of the ground surface one at a time, and then the swing leg is manually pivoted to the desired orientation where it is fixed in place using turn buckles. The transport position of the Swisher machine is shown in its FIG. 2. Disadvantages of this system include the need to individually raise each track off the ground one at a time, and the need to realign the steering after adjusting the leg orientation.

Another approach is found in Aeschlimann U.S. Pat. No. 6,872,028 in which the swing legs are constructed as parallelogram linkages mounted on a mounting bracket. The entire mounting bracket and parallelogram linkage can be pivoted 90 degrees for transport as shown in FIG. 16 of Aeschlimann.

Another solution is provided in Guntert U.S. Pat. No. 8,459,898. Each crawler track is steerable through a steering angle of 90 degrees relative to its swing leg. As shown in Guntert FIGS. 8A-8E, with the track oriented at 90 degrees to the swing leg, the track is advanced to pivot the swing leg through a pivot angle of 90 degrees to a transport position. Guntert pivots its swing legs one at a time from the paving orientation to the transport orientation, while the machine frame remains in a fixed position on the ground.

None of the techniques for repositioning of the swing legs relative to the machine frame for transport of the construction machine described above provide for the re-orientation of the frame on the ground to align the frame of the paving machine with a transport vehicle. In the prior art such re-orientation is typically done separately prior to the repositioning of the swing legs relative to the machine frame.

Thus there is a continuing need for improvements in the arrangements for the control of the pivoting of swing legs of such automotive construction machines to reorient the swing legs to a transport position.

SUMMARY OF THE INVENTION

In one embodiment a method is provided for preparing a paving machine for transport, the paving machine including:
 a frame including a rear and a front, the frame defining a paving direction extending from the rear to the front;
 a plurality of swing legs pivotally connected to the frame; and
 a plurality of ground engaging units, one ground engaging unit being steerably connected to each one of the swing legs, each of the ground engaging units including a drive such that the ground engaging unit is driven across the ground;
 the method comprising the steps of:
  (a) driving the ground engaging units to rotate the frame substantially in place on the ground through a re-orientation angle of the frame relative to the ground; and;
  (b) as the frame is rotating, pivoting one or more of the swing legs from a paving position relative to the frame, to a transport position relative to the frame.

In another embodiment a construction machine includes a machine frame, and first, second, third, and fourth swing legs pivotally connected to the machine frame. First, second, third, and fourth ground engaging units are steerably connected to the first, second, third, and fourth swing legs, respectively. The ground engaging units include drive motors configured such that the ground engaging units are driven across a ground surface by the drive motors. First, second, third, and fourth steering sensors are configured to detect steering angles of the first, second, third, and fourth ground engaging units relative to the first, second, third, and fourth swing legs, respectively. First, second, third, and fourth locks are configured to selectively lock and unlock the first, second, third, and fourth swing legs, respectively, in pivotal position relative to the machine frame. A controller includes a transport re-orientation mode configured to rotate the machine frame substantially in place on the ground through a re-orientation angle, and as the machine frame is rotating to pivot the swing legs from an operating orientation to a transport orientation relative to the machine frame.

In any of the above embodiments, in the transport position the swing leg may be positioned at a pivot angle of at least 80 degrees relative to the paving direction.

In any of the above embodiments, the swing legs may pivot one at a time.

In any of the above embodiments, the swing legs may pivot two at a time.

In any of the above embodiments, all of the swing legs may pivot at the same time.

In any of the above embodiments, the re-orientation angle of the frame may be in a range from 60° to 120°, which may more generally be described as plus or minus 30° about an odd multiple of 90°.

In any of the above embodiments, the re-orientation angle of the frame may be in a range from 80° to 100°, which may more generally be described as plus or minus 10° about an odd multiple of 90°.

In any of the above embodiments, the re-orientation angle of the frame may be substantially 90°, which may more generally be described as substantially an odd multiple of 90°.

In any of the above embodiments, prior to driving the ground engaging units to rotate the frame, each of the ground engaging units may be steered such that a drive axis of each of the ground engaging units intersects at a common point defining a center of rotation of the frame.

In any of the above embodiments, the frame may include a left side and a right side, and the center of rotation of the frame may lie substantially on a centerline of the frame mid-way between the left side and the right side.

In any of the above embodiments, the frame may include a front and a rear, and the center of rotation of the frame may lie substantially on a lateral centerline of the frame, the lateral centerline being substantially mid-way between the front and the rear.

In any of the above embodiments, the frame may include a front and a rear, and the center of rotation of the frame may lie substantially offset from a lateral centerline of the frame, the lateral centerline being substantially mid-way between the front and the rear.

In any of the above embodiments, the pivoting of the one or more swing legs relative to the frame may be performed at least in part by controlling a differential speed of the ground engaging units relative to each other.

In any of the above embodiments, the pivoting of the one or more swing legs relative to the frame may be performed at least in part by steering the ground engaging units at different steering angles relative to their respective swing legs.

In any of the above embodiments, the pivoting of the one or more swing legs relative to the frame may be performed at least in part by selectively controlling a pivotal connection between each swing leg and the frame.

In any of the above embodiments the frame may include a left side and a right side, a frame length between the front and the rear, and a frame width between the left side and the right side, the frame width being greater than the frame length. The plurality of swing legs may include a left front swing leg, a right front swing leg, a left rear swing leg and a right rear swing leg. The plurality of ground engaging units may include a left front crawler track, a right front crawler track, a left rear crawler track and a right rear crawler track, all of the crawler tracks being driven. And by the time the frame is rotated through the re-orientation angle, all of the swing legs may be pivoted to their transport positions.

In any of the above embodiments, the driving of the ground engaging units to rotate the frame, and the pivoting of the swing legs may be performed under control of an automatic controller in accordance with a set of pre-programmed operating instructions.

In any of the above embodiments, after the rotation of the frame through the re-orientation angle, the machine may be driven onto a transport vehicle under power of the ground engaging units.

In any of the above embodiments the machine may include a plurality of locks, each lock being configured to selectively lock a respective one of the swing legs in a pivotal position relative to the frame, and each of the locks may be unlocked prior to pivoting its associated swing leg.

In any of the above embodiments each lock may comprise a linear actuator configured to hold its respective swing leg in a selected pivotal position relative to the frame, and the unlocking may comprise de-activating the linear actuator so that the linear actuator does not resist the pivotal motion of the respective swing leg relative to the frame.

In any of the above embodiments each lock may comprise a linear actuator configured to hold its respective swing leg in a selected pivotal position relative to the frame, and the linear actuator may actively facilitate the pivotal motion of the its respective swing leg relative to the frame.

In any of the above embodiments the linear actuator may cause an absolute quantity of pivotal motion of its respective swing leg as determined by a controller according to an algorithm.

In any of the above embodiments each lock may comprise a hydraulic ram configured to hold its respective swing leg in position relative to the frame, a hydraulic supply line connected to the hydraulic ram, and a pressure control valve located in the supply line, and the hydraulic ram may actively facilitate the pivoting of the respective swing leg, the actively facilitating may be limited by providing a hydraulic pressure to the hydraulic ram controlled by the pressure control valve.

In any of the above embodiments, prior to driving the ground engaging units to rotate the frame, the locks may be unlocked and then each of the ground engaging units may be steered to a steering angle of no greater than 45° relative to its respective swing leg.

In any of the above embodiments, during the pivoting of the swing legs the steering angle of each ground engaging unit may be increased as its respective swing leg is pivoted toward its transport position relative to the frame.

In any of the above embodiments the construction machine may be a slip form paving machine.

In any of the above embodiments the ground engaging units may be either crawler tracks or wheels.

BRIEF DESCRIPTION OF THE DRAWINGS

FIG. 2 shows the special case wherein the swing leg initially extends straight ahead and the initial steering angle of the crawler track is straight ahead.

DETAILED DESCRIPTION

Figure 1A:
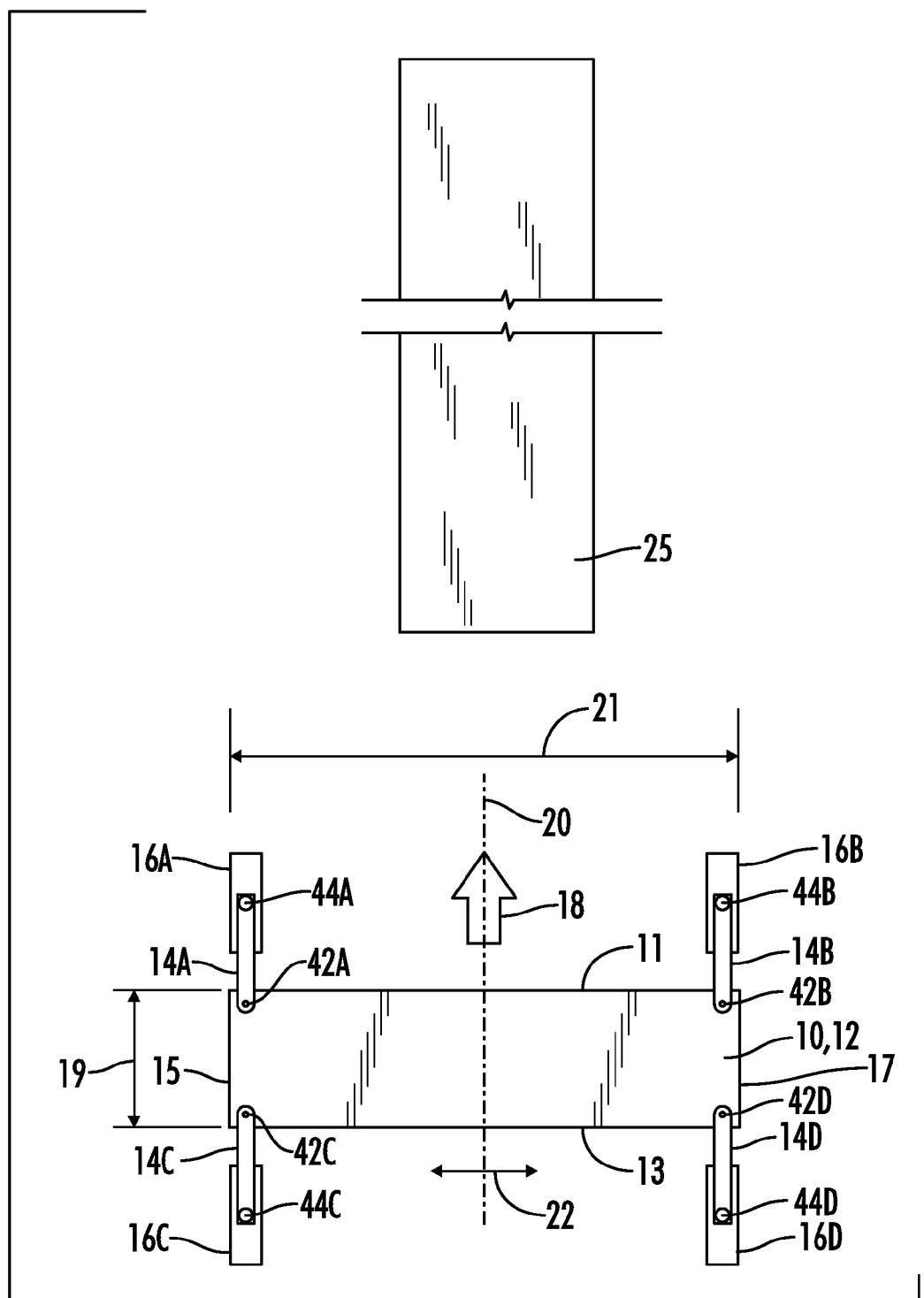
FIG. 1A is a schematic plan view of a self-propelled construction machine. A trailer is shown adjacent the construction machine and oriented at about a 90 degree angle relative to the longer dimension of the construction machine.

FIG. 1A schematically illustrates a self-propelled construction machine 10. The machine 10 includes a machine frame 12. The machine frame 12 may be described as having a front 11, a rear 13, a left side 15 and a right side 17. The frame 12 has a frame length 19 defined between the front 11 and rear 13. The frame 12 has a frame width 21 defined between the left side 15 and right side 17.

Figure 10:
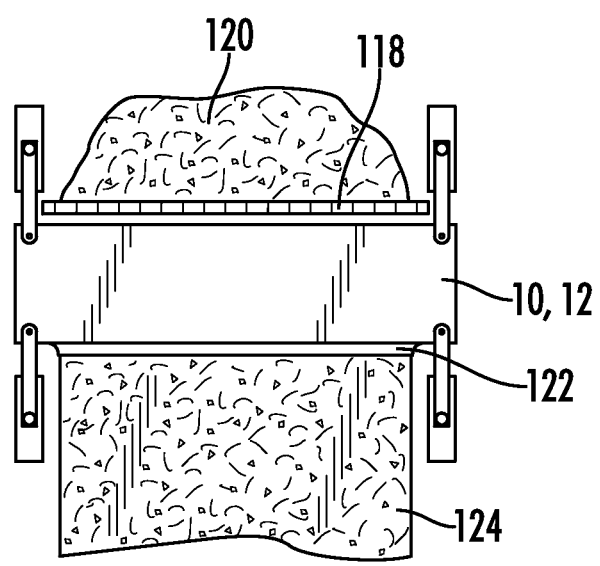
FIG. 10 is a schematic plan view of the construction machine of FIG. 1A embodied as a slipform paving machine.

As schematically illustrated in FIG. 10, the construction machine 10 may be a slip-form paver having a spreader apparatus 118 arranged to engage a mass 120 of concrete which is shaped by form 122 so that a shaped slab 124 of concrete is slip-formed by the machine 10 and exits the rear of the machine 10.

The slip-form paving machine 10 illustrated in FIG. 10 may be of any conventional construction with regard to its machine frame 12 and the arrangement of supporting swing legs and crawler tracks. The machine frame 12 may be a fixed width frame. The machine frame 12 may be a single telescoping frame which expands to one side of a main frame module for adjustment of frame width. The machine frame 12 may be a dual telescoping frame which extends from both sides of the main frame module for expansion and contraction of the width of the machine frame. The lateral sides or bolsters of the frame 12 may also be extendable in the operating direction to increase the length of the frame for mounting of accessories, such as a dowel bar inserter or the like behind the frame. The slip-form paving machine 10 may have either three or four tracks, at least one track being connected to an associated swing leg.

First, second, third and fourth swing legs 14A, 14B, 14C and 14D are pivotally connected to the machine frame 12 at pivotal axes 42A, 42B, 42C and 42D. First, second, third and fourth crawler tracks 16A, 16B, 16C and 16D are steerably connected to free ends of the swing legs 14A, 14B, 14C and 14D, respectively, at steering axes 44A, 44B, 44C and 44D. The crawler tracks may be generally referred to as ground engaging units. The ground engaging units may be crawler tracks as shown, or alternatively may be wheels. The swing legs may be referred to as left front swing leg 14A, right front swing leg 14B, left rear swing leg 14C and right rear swing leg 14D.

The machine frame 12 defines a longitudinal direction 18 along a longitudinal axis 20 for forward or reverse motion of the construction machine 10. The machine frame further defines a lateral direction 22 perpendicular to the longitudinal direction 18. The machine 10 moves across a ground surface under the power of the crawler tracks.

Also shown in position ahead of the paving machine 10 is a transport vehicle 25, which may for example be a flatbed trailer 25 pulled by a tractor. The trailer 25 is shown adjacent the construction machine and oriented at about a 90 degree angle relative to the width 21 of the machine 10 as would be the typical case when an operating paving machine 10 stops and is to be re-oriented for loading on the trailer 25.

Figure 1B:
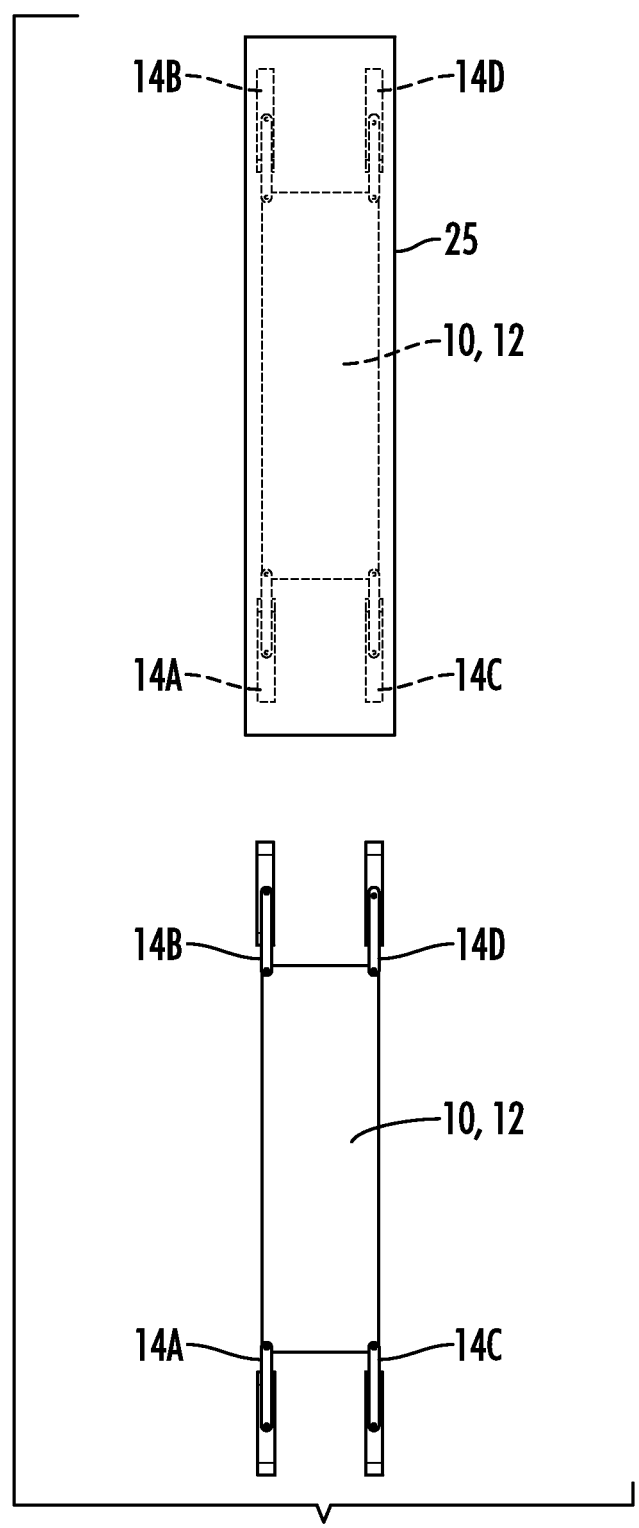
FIG. 1B is a schematic plan view similar to FIG. 1A, showing the construction machine in solid lines after the frame of the construction machine has been rotated in place on the ground through a re-orientation angle of about 90 degrees, and after the swing legs have been pivoted to their transport position where the swing legs and the crawler tracks are generally aligned with the longer dimension of the construction machine so that the machine can drive onto the trailer. The machine is shown in dashed lines after it has driven onto the trailer.

In FIG. 1B the construction machine 10 is shown in solid lines after the frame 12 of the construction machine has been rotated in place on the ground through a re-orientation angle of about 90 degrees, and after the swing legs 14A-14D have been pivoted to their transport position where the swing legs and the crawler tracks are generally aligned with the longer dimension of the construction machine so that the machine can drive onto the trailer. The machine 10 is shown in dashed lines after it has driven onto the trailer 25.

As is further described below, each crawler track 16 can be steered through a steering angle relative to its swing leg 14, and each swing leg 14 can be pivoted through a pivot angle relative to the machine frame 12. The basic geometry of this steering and pivoting motion is best explained with reference to FIG. 2, in which the track 16A is shown in an initial orientation in solid lines, and oriented at a non-zero steering angle 24 in dashed lines. Similarly, the swing leg 14A is shown in an initial position in solid lines, and is shown as having been pivoted through a pivot angle 28 in dashed lines.

Figure 2:
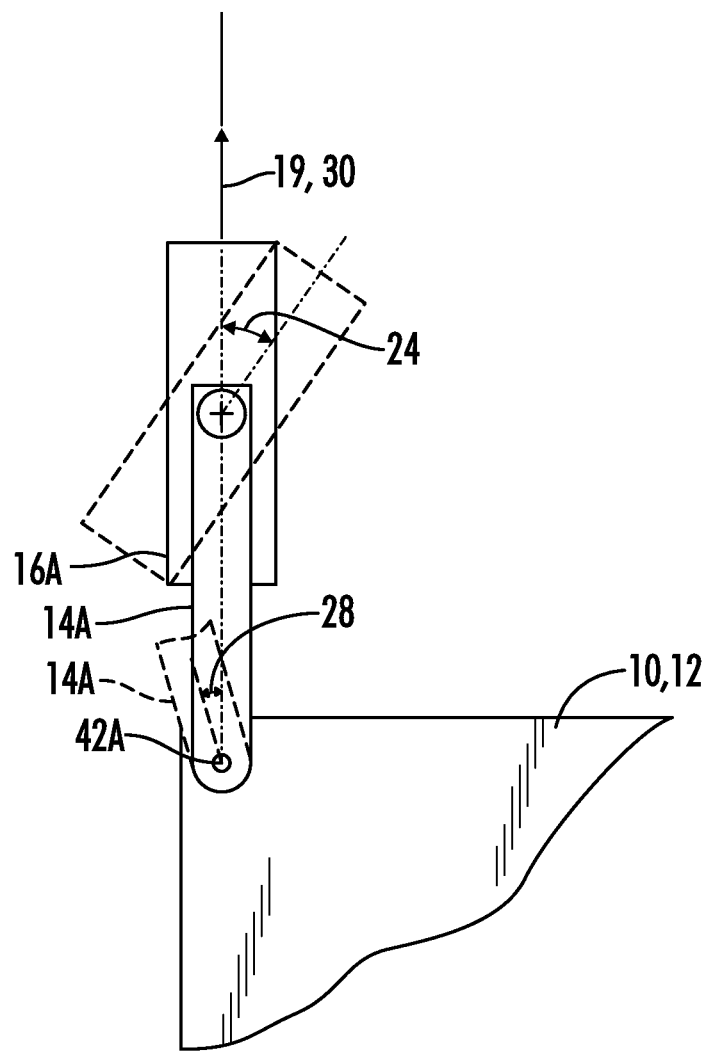
FIG. 2 is a schematic plan view of the left front corner of the construction machine of FIG. 1 illustrating the steering angle of the crawler track relative to the swing leg, and illustrating the pivot angle of the swing leg relative to the machine frame.
Figure 2A:
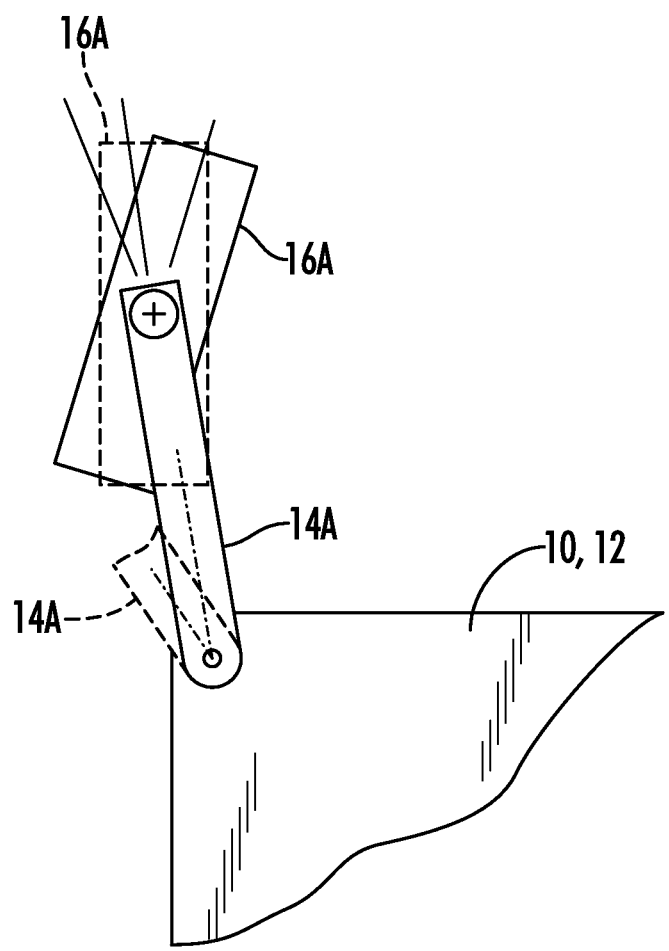
FIG. 2A is a view similar to FIG. 2 showing the more general situation wherein the swing leg initially does not extend straight ahead and the initial steering angle of the crawler track is not straight ahead.

In the example shown in FIG. 2, for ease of illustration the initial steering angle has been shown as a straight ahead direction, and the initial position of the swing leg has been shown as a straight ahead position. But it will be understood that in the more general and typical situation the pivot legs will not necessarily begin in the straight ahead position and the initial steering angle of the tracks will not necessarily begin in the straight ahead direction. More generally, as shown in FIG. 2A the starting point for a steering operation as described herein begins with the pivot legs in an initial position and the tracks steering in an initial direction, neither of which need be oriented straight ahead. For example, the forward pivot legs may already be angled away from each other, and the tracks may be oriented at a non-zero steering angle as seen in FIG. 2A, and from that initial starting position a repositioning and re-orientation operation as described below may be performed.

Figure 3:
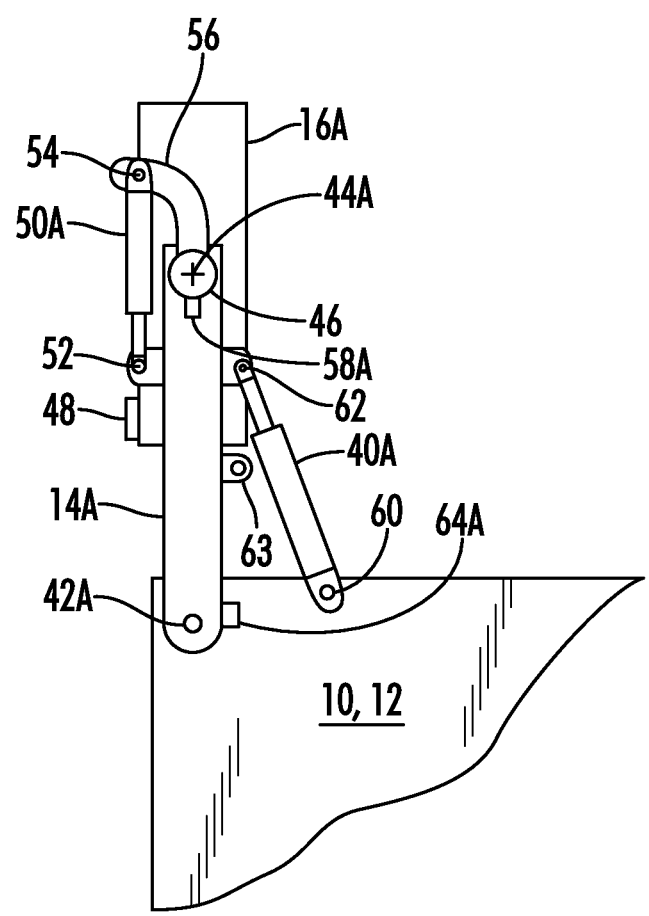
FIG. 3 is a schematic plan view of the left front corner of the construction machine of FIG. 1A showing the mechanical components of the steering system and the pivot control system of the left front swing leg. This pivot control system provides a secondary connection to allow the hydraulic ram to actively facilitate pivoting of the swing leg through an arc of greater than 90 degrees.

FIG. 3 schematically illustrates the mechanical components of a steering system and a pivot control system of the machine 10. It is noted that before each swing leg 14 can be pivoted a locking mechanism associated with the swing leg must be released as is described below regarding the hydraulic ram or locking mechanism designated as 40A, 40B, etc. Each hydraulic ram may also be referred to as a linear actuator or as a hydraulic actuator or as a hydraulic cylinder. It is noted that the linear actuators could also be electric actuators rather than hydraulic actuators.

In FIG. 3, the first swing leg 14A is shown pivotally connected to the machine frame 12 at pivotal connection or pivotal axis 42A. The first crawler track 16A is steerably connected to the outer end of swing leg 14A so that the crawler track 16A can be steered about the vertical steering axis 44A of a lifting column 46 by which the outer end of the swing leg 14A is supported from the crawler track 16A. As will be understood by those skilled in the art, extension and retraction of the lifting column 46 can raise and lower the machine frame 12 relative to the crawler track 16A and thus relative to the ground surface. Each of the crawler tracks includes a drive motor 48 such that the crawler tracks are driven across the ground surface by the drive motors in a known manner. The drive motor 48 may be either a hydraulic motor or an electric motor.

Steering of the crawler track 16A relative to the swing leg 14A about the vertical axis 44A is accomplished by extension and retraction of a hydraulic steering cylinder 50A pivotally connected at 52 to an intermediate location on the swing leg 14A and pivotally connected at 54 to a steering arm 56 connected to rotate with the crawler track 16A. Alternatively, instead of the use of a hydraulic ram steering cylinder 50A, the track 16A may be steered relative to the swing leg 14A by a rotary actuator such as a worm gear or slew gear drive. Also, an electric actuator may be used instead of a hydraulic actuator, to steer the crawler track.

Each of the swing legs such as 14A may have a steering sensor 58 associated therewith, which steering sensors are configured to detect the steering angles of their respective crawler tracks relative to their respective swing legs. The steering sensors associated with the crawler tracks 16A and 16B are designated as 58A and 58B in the schematic control diagram of FIG. 7. The steering sensors may for example each be an electro-magnetic encoder, commercially available from TWK-Elektronik GmbH, Heinrichstrasse 85, 40239 Dusseldorf, Germany, as TMA 50-S A 180 W S A 16.

The swing leg 14A can be held in place pivotally relative to the frame 12 by the previously mentioned hydraulic ram 40A. The hydraulic ram 40A is pivotally connected to the machine frame 12 at pivotal connection 60 and to an intermediate location on the swing leg 14A at pivotal connection 62. As is further discussed below, a secondary connection point 63 is provided on each swing leg to allow the connection point of hydraulic ram 40A to be relocated during movement to the transport position of the swing leg.

In the drawings the swing legs 14 and the hydraulic rams 40 are schematically illustrated as being directly connected to the machine frame 12. It will be understood, however, that the swing legs and the hydraulic rams do not have to be directly connected to the machine frame 12. Instead, the swing legs and the hydraulic rams may be indirectly connected to the machine frame 12 by suitable mounting brackets. When one of these components is described herein as being connected to the machine frame, that includes both direct and indirect connections.

Each of the swing legs such as 14A may have a pivot sensor 64 configured to detect the respective pivot angle 28 of the respective swing leg 14. In the schematic view of the control diagram of FIG. 7, the pivot sensors for the first and second swing legs 14A and 14B are indicated as 64A and 64B. The pivot sensors may for example each be an angle sensor commercially available from Elobau GmbH & Co. KG, Zeppelinstr. 44, 88299 Leutkirch, Germany, as Part No. 424A11A05002.

Figure 7:
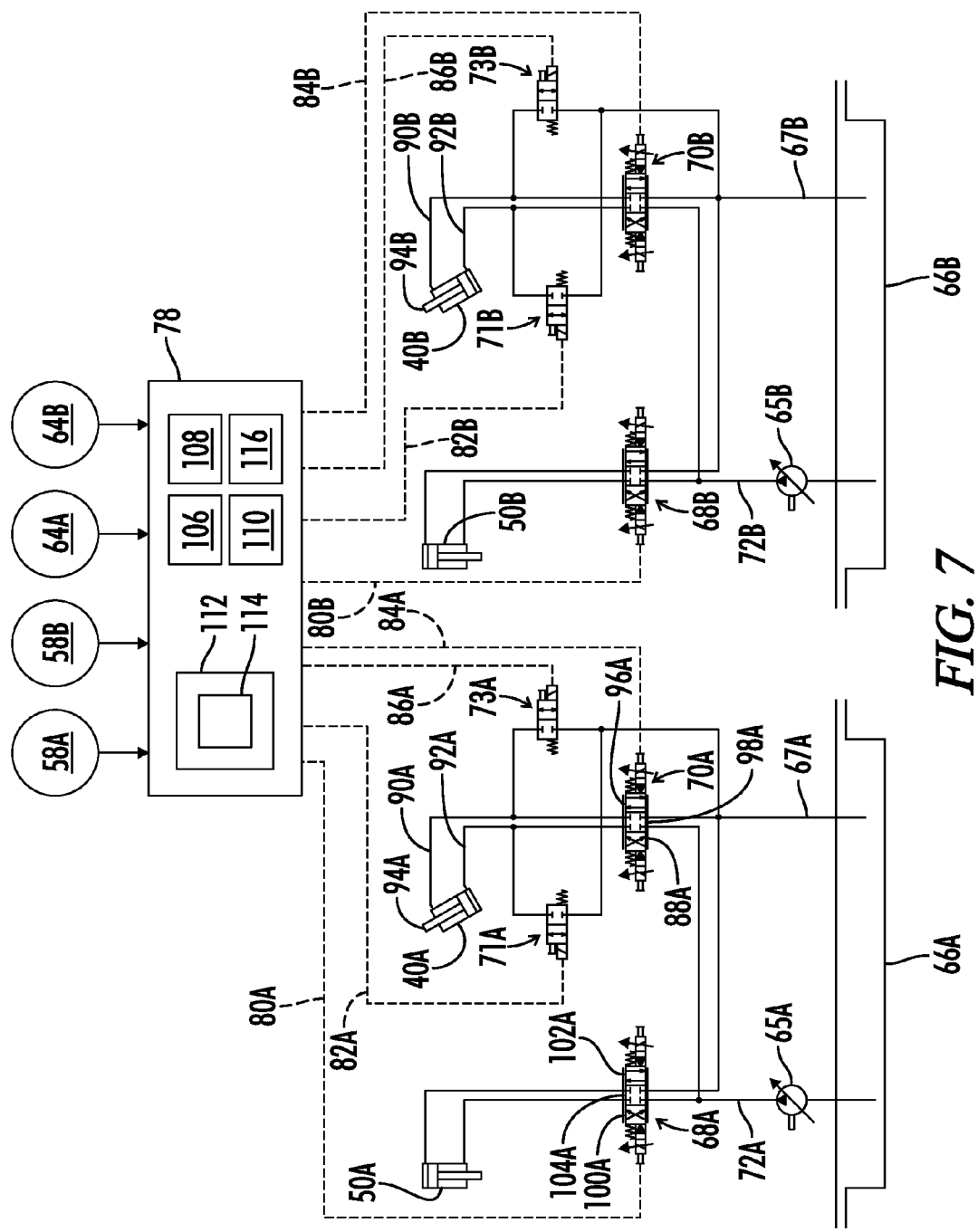
FIG. 7 is a schematic illustration of the hydraulic power system and the electronic control system for the steering system and the pivot control system of the construction machine of FIG. 1A.
Figure 8:
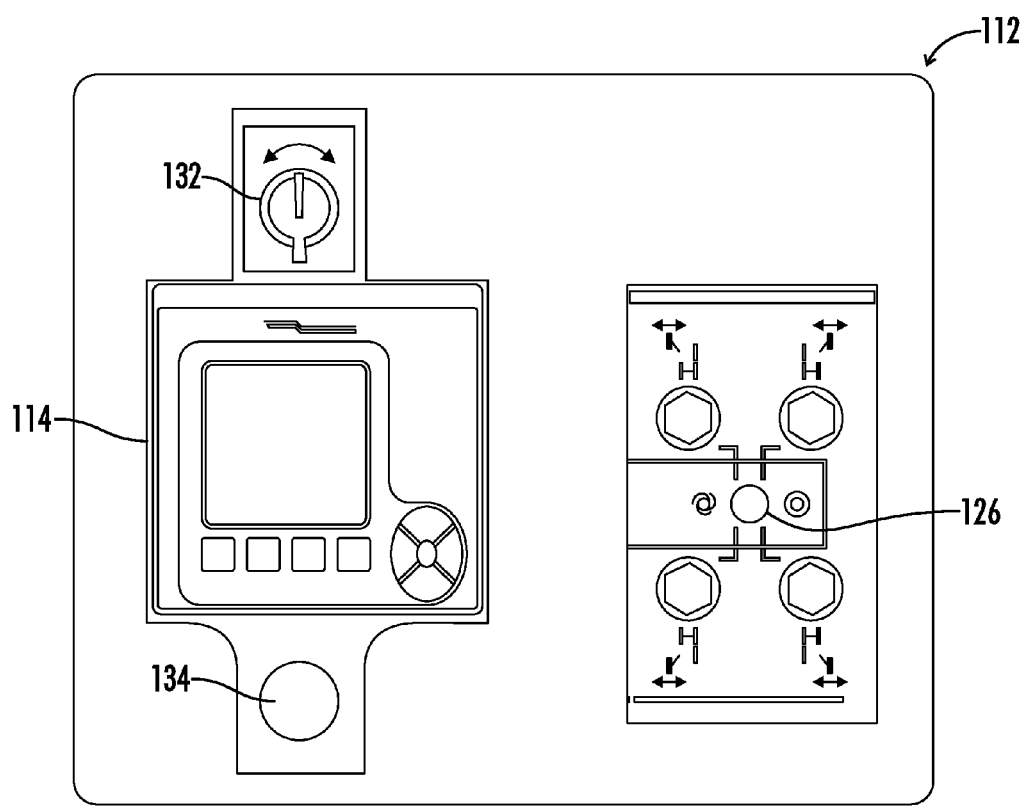
FIG. 8 is a schematic view of the control panel of the controller of FIG. 7.
Figure 9:
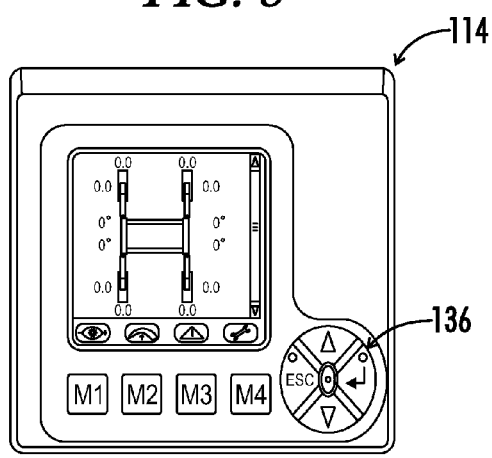
FIG. 9 is an enlarged view of the display screen and certain ones of the input controls for the control panel of FIG. 8.

The Control System of FIGS. 7-9

FIG. 7 schematically illustrates, among other things, one embodiment of a hydraulic control diagram for operation of the steering cylinder 50A and the hydraulic ram 40A associated with crawler track 16A and swing leg 14A. Also shown in FIG. 7 are the similar steering cylinder 50B and hydraulic ram 40B associated with crawler track 16B and swing leg 14B. It will be understood that similar controls are provided to the rear swing legs and crawler tracks.

The steering cylinder 50A and the hydraulic ram 40A may each be double acting hydraulic cylinders. Hydraulic fluid under pressure is provided to the cylinders from a source such as hydraulic pump 65A, and fluid discharged from the cylinders is returned to a hydraulic reservoir 66A via a return line 67A. Although FIG. 7 shows individual pumps 65 and reservoirs 66 for each leg, a common pump and reservoir may be used for multiple legs.

Directional control of hydraulic fluid into and out of the steering cylinder 50A is controlled by a first solenoid actuated variable flow three way servo-valve 68A, and control of fluid into and out of the hydraulic ram 40A is controlled by a second solenoid actuated variable flow three way servo-valve 70A.

Hydraulic fluid under pressure from pump 65A flows through a hydraulic fluid supply line 72A, to each of the variable flow three way servo-valves 68A and 70A. These variable flow valves may also be referred to as proportional valves. The valves 68A and 70A can control both the direction and the rate of flow of fluid to their respective hydraulic cylinders.

The three way valve 70A associated with the hydraulic ram 40A has a first position 88A wherein hydraulic fluid under pressure is provided to an upper end of the cylinder via hydraulic line 90A and received from a lower end of the cylinder via hydraulic line 92A for retraction of a piston 94A of the hydraulic ram 40A. The three way valve 70A can be moved to a second position 96A in which the direction of flow is reversed to extend the piston 94A. The three way valve 70A can be moved to a third position 98A wherein flow of hydraulic fluid to and from the hydraulic ram 40A is blocked. It is noted that the hydraulic lines 90A and 92A may be referred to as first and second hydraulic lines 90A and 92A, but such designation is for identification only and does not imply any specific functionality.

Also associated with the hydraulic ram 40A are first and second solenoid actuated bypass valves 71A and 73A connected to the hydraulic lines 92A and 90A. Each of the bypass valves can be selectively moved to either an open or a closed position as indicated. When in their open positions the bypass valves communicate both sides of the hydraulic ram 40A with the hydraulic reservoir 66A via the return line 67A.

Each of the hydraulic rams 40 and its associated three way valve 70 and bypass valves 71 and 73 may be referred to as a hydraulic control system or as a lock.

The construction machine 10 includes a controller 78, which may be part of a master control system of the machine 10, or may be a separate controller. The controller 78 receives input signals from various sensors such as the steering sensors 58A and 58B and the pivot sensors 64A and 64B.

It will be understood that the controller 78 may receive additional input signals from steering sensors and pivot sensors associated with the third and fourth tracks 16C and 16D, which additional inputs are not illustrated in FIG. 7. Controller 78 may also receive other inputs such as advance speed, distance traveled or other operational parameters of machine 10. One possible input for the advance speed and distance traveled by each crawler track 16 may be obtained with a sensor attached to each drive motor 48 to detect the input to the track from the drive motor. Optionally, if one wishes to avoid the possibility of input error due to track slippage, the speed and distance traveled by machine 10 may be obtained by a separate sensor that directly detects the distance traveled relative to the ground.

The controller 78 can control the volume and direction of hydraulic flow to and from the steering cylinder 50A and hydraulic ram 40A via control signals sent to three way valves 68A and 70A, respectively, over control lines 80A and 84A. The controller 78 can control the position of the bypass valves 71A and 73A via control signals sent over control lines 82A and 86A, respectively.

If three way valve 70A is in its blocked position 98A, and the bypass valves 71A and 73A are also in their blocked or closed positions, then the hydraulic ram 40A is hydraulically blocked so that it cannot move.

The hydraulic control system shown in FIG. 7 associated with hydraulic ram 40A has two alternative un-blocked positions.

In a first un-blocked position, if three way valve 70A is in its closed position 98A, and the bypass valves 71A and 73A are in their open positions, the hydraulic ram 40A is unblocked and is free to be moved by any force including but not limited to the action of the crawler track 16A pivoting the swing leg 14A. This may be described as a free floating arrangement for the hydraulic ram 40A.

In a second un-blocked position, if the three way valve 70A is in either of its positions 88A or 96A, and the bypass valves 71A and 73A are in their closed positions, then the motion of the hydraulic ram 40A can be actively facilitated by hydraulic power, or can be forced by hydraulic power, depending upon the volume of fluid supplied by pump 65A under the control of controller 78.

Similarly, the three way valve 68A associated with the steering cylinder 50A defines first and second positions 100A and 102A controlling the direction of flow to and from the steering cylinder 50A, and a third position 104A in which flow to and from the steering cylinder 50A is blocked so as to hold or maintain a given steering position of the crawler track 16A relative to the swing leg 14A.

The hydraulic lines and control lines for steering cylinder 50B and hydraulic ram 40B associated with the second crawler track 16B and the second swing leg 14B are schematically shown on the right hand side of FIG. 7 and analogous components are designated by the same numerals using a suffix B in place of a suffix A.

Figure 7A:
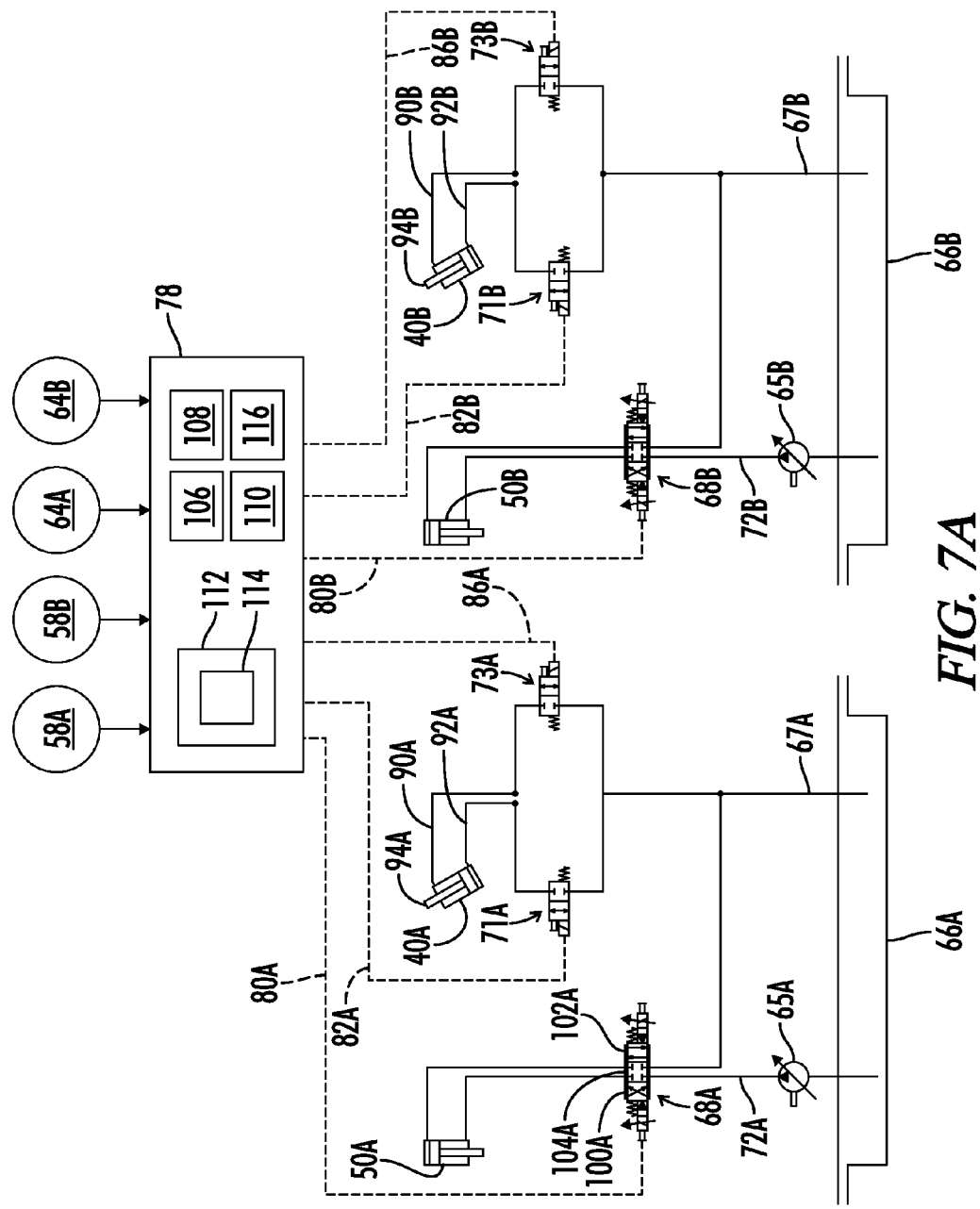
FIG. 7A is a schematic illustration similar to FIG. 7 showing an alternative embodiment of a hydraulic control system for blocking and unblocking the pivoting motion of the swing legs.

FIG. 7A is similar to FIG. 7 and illustrates a first alternative embodiment of the hydraulic control systems associated with the hydraulic rams 40A and 40B. In the embodiment of FIG. 7A the three way valves 70A and 70B of FIG. 7 have been eliminated so that the locking and unlocking of the hydraulic rams 40A and 40B is controlled solely by the bypass valves. This provides what may be referred to as a free floating arrangement of the hydraulic rams 40A and 40B. For example, the ram 40A and bypass valves 71A and 73A, along with the various hydraulic lines connected thereto may be referred to as a lock or hydraulic control system associated with the first swing leg 14A. That hydraulic control system may be described as including the first hydraulic ram 40A having a piston and a cylinder, the piston dividing the cylinder into first and second ends. First and second hydraulic lines 90A and 92A connect the fluid reservoir 66A to the first and second ends of the cylinder. The first and second bypass valves 71A and 73A are connected to the hydraulic lines 92A and 90A, respectively. Each bypass valve has a blocked position and a bypass position, the bypass position communicating the respective end of the first hydraulic ram 40A to the fluid reservoir 66A. In the hydraulically blocked position of the hydraulic control system, the first and second bypass valves 71A and 73A are in their blocked positions. In the hydraulically un-blocked position of the hydraulic control system the first and second bypass valves 71A and 73A are in their bypass positions. With this arrangement, when in the un-blocked position, the swing leg 14A is free to be moved by the forces created by engagement of the track 16A with the ground, or with any other forces imposed on the swing leg 14A, but there is no active facilitation of the pivoting of the swing leg by the hydraulic ram 40A.

Figure 7B:
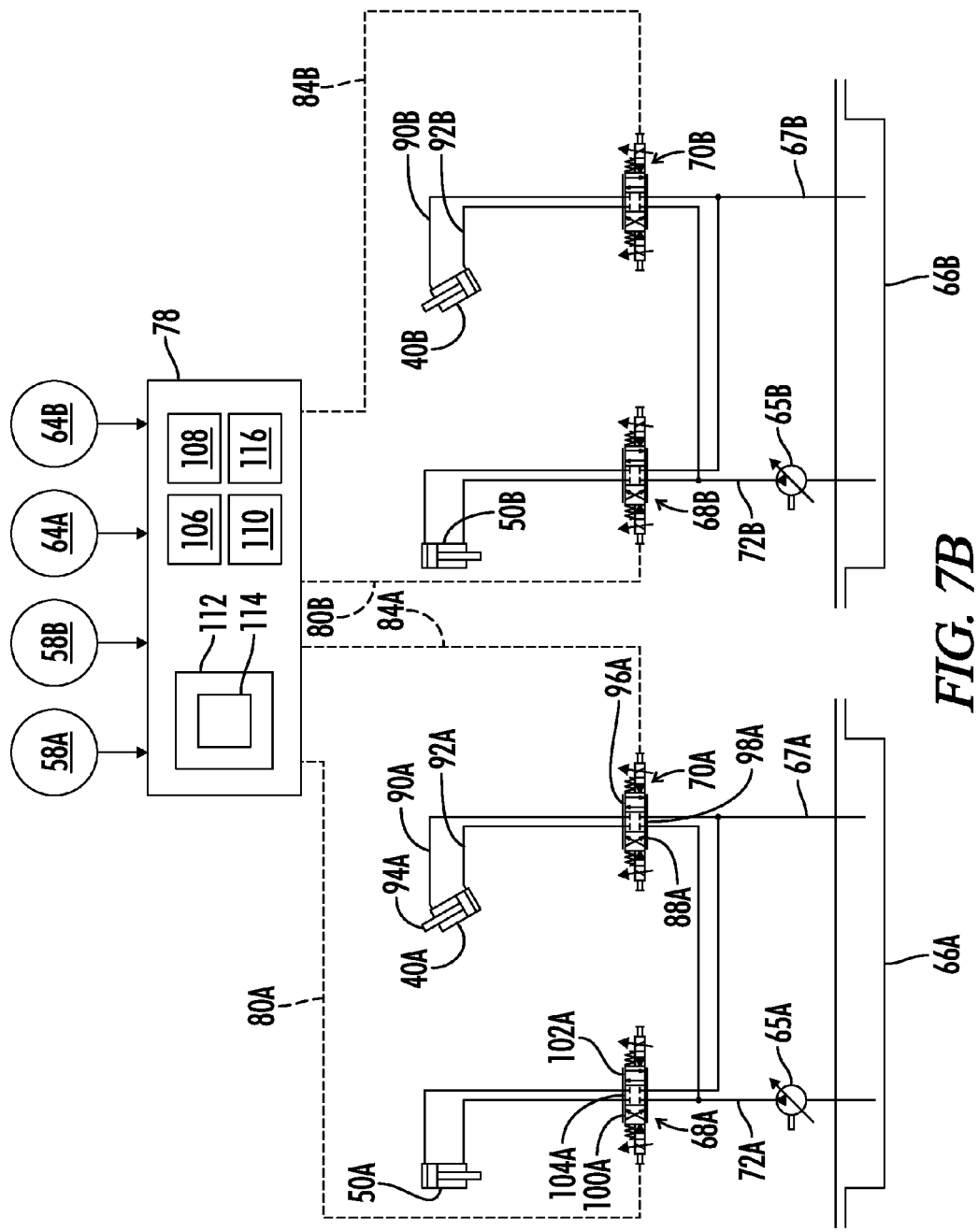
FIG. 7B is a schematic illustration similar to FIG. 7 showing another alternative embodiment of a hydraulic control system for blocking and unblocking the pivoting motion of the swing legs.

FIG. 7B is similar to FIG. 7 and illustrates a second alternative embodiment of the hydraulic control systems associated with the hydraulic rams 40A and 40B. In the embodiment of FIG. 7B the bypass valves have been eliminated so that the locking and unlocking of the hydraulic rams 40A and 40B is controlled solely by the three way valves 70A and 70B. This provides what may be referred to as a stroke controlled arrangement of the hydraulic rams 40A and 40B. For example, the ram 40A and three way valve 70A along with the various hydraulic lines connected thereto may be referred to as a lock or hydraulic control system associated with the first swing leg 14A. That hydraulic control system may be described as including the first hydraulic ram 40A having a piston and a cylinder, the piston dividing the cylinder into first and second ends. The three way valve 70A has an extension position 96A, a retraction position 88A, and a blocked position 98A. The hydraulic lines 90A and 92A connect the three way valve 70A to the first and second ends of the cylinder. The supply line includes supply line 72A and a selected one of the lines 90A and 92A, and the return line includes the return line 67A and the other of the lines 90A and 92A. In the hydraulically blocked position of the hydraulic control system the three way valve 70A is in the blocked position 98A. In the hydraulically un-blocked position of the hydraulic control system, the three way valve 70A is in either its extension or retraction position 96A or 88A, and the controller 78 is configured such that the first hydraulic ram 40A actively facilitates the pivoting of the first swing leg 14A. The controller 78 may determine a specific amount of desired movement of the swing leg 14A via an algorithm, and the controller 78 may then cause a specific volume of fluid to be delivered to hydraulic ram 40A so that a stroke or extension of the hydraulic ram 40A is exactly controlled. The algorithm may calculate the exact movement of the swing leg 14A which will result from the advance speed and steering inputs to the track 16A, and then actively facilitate the movement of the swing leg by that same amount so that frictional forces or other resistance to the movement of the swing leg assembly are compensated for by the active facilitation. It will be understood that with this arrangement, if the algorithm is slightly in error it is the stroke imparted to the hydraulic ram 40A that will control the final pivotal position of the swing leg 14A.

Figure 7C:
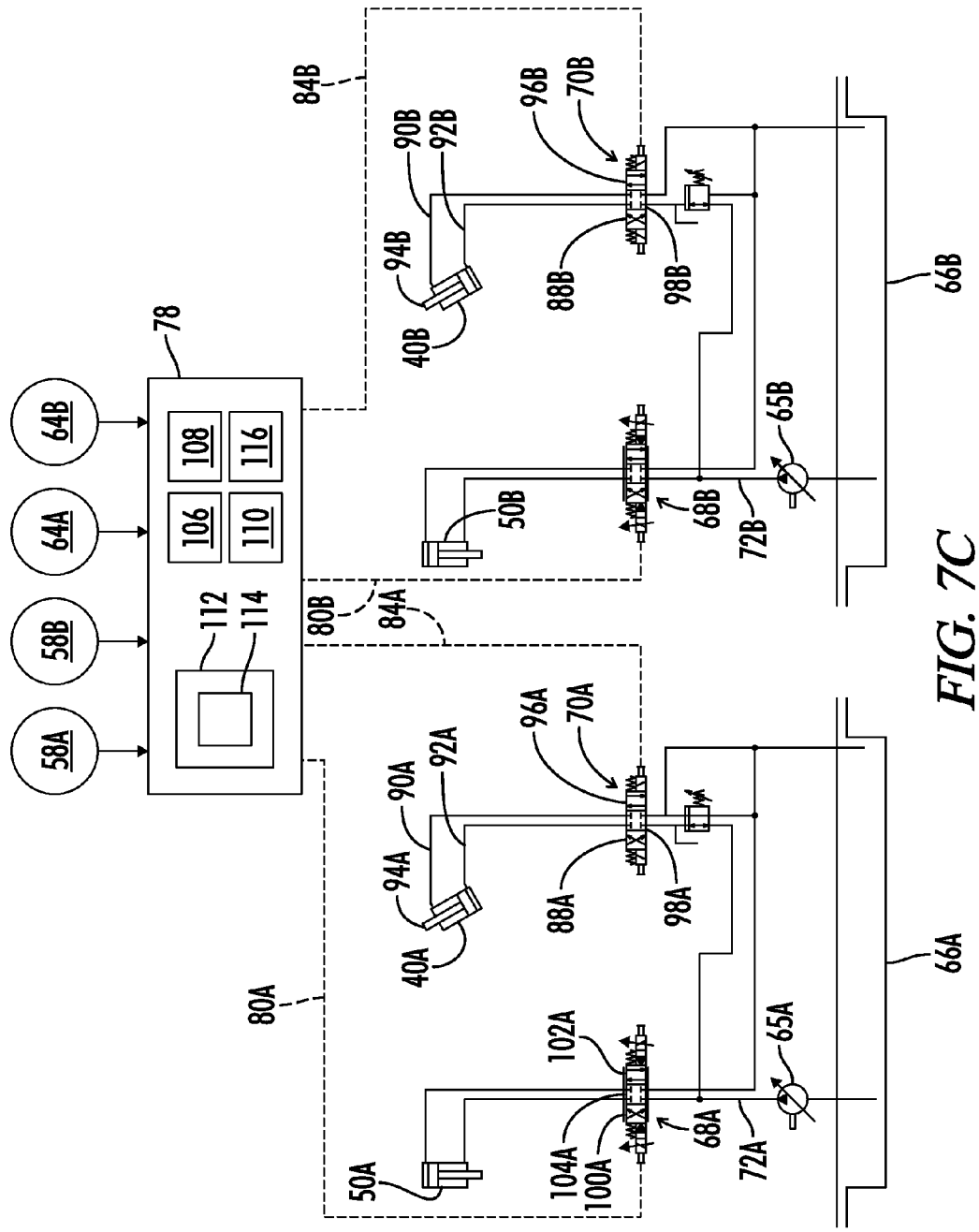
FIG. 7C is a schematic illustration similar to FIG. 7 showing another alternative embodiment of a hydraulic control system for blocking and unblocking the pivoting motion of the swing legs.

FIG. 7C is similar to FIG. 7 and illustrates a third alternative embodiment of the hydraulic control systems associated with the hydraulic rams 40A and 40B. In the embodiment of FIG. 7C the bypass valves have been eliminated and the three way valves 70A and 70B have been modified to be simpler and less expensive three way valves that are not servo-valves. Also, pressure control valves 75A and 75B have been added in the fluid supply lines 72A and 72B upstream of the three way valves 70A and 70B. With this arrangement the controller 78 is configured such that the active facilitation of the pivoting of the swing legs 14A and 14B by the hydraulic rams 40A and 40B is limited to providing a hydraulic pressure to the hydraulic rams 40A and 40B controlled by the pressure control valves 75A and 75B.

The arrangement of FIG. 7C provides what may be referred to as a pressure controlled arrangement of the hydraulic rams 40A and 40B. For example, the ram 40A and three way valve 70A along with the various hydraulic lines connected thereto may be referred to as a lock or hydraulic control system associated with the first swing leg 14A. That hydraulic control system may be described as including the first hydraulic ram 40A having a piston and a cylinder, the piston dividing the cylinder into first and second ends. The three way valve 70A has an extension position 96A, a retraction position 88A, and a blocked position 98A. Hydraulic lines 90A and 92A connect the three way valve 70A to the first and second ends of the cylinder. The supply line includes supply line 72A and a selected one of the lines 90A and 92A, and the return line includes the return line 67A and the other of the lines 90A and 92A. In the hydraulically blocked position of the hydraulic control system the three way valve 70A is in the blocked position 98A. In the hydraulically un-blocked position of the hydraulic control system, the three way valve 70A is in either its extension or retraction position 96A or 88A, and the controller 78 is configured such that the first hydraulic ram 40A actively facilitates the pivoting of the first swing leg 14A by supplying a pressure to the selected end of the hydraulic ram 40A controlled by the pressure control valve 75A. It will be understood that with this arrangement, the steering of the track 16A and various other force inputs will control the final pivotal position of the swing leg 14A, and the pressure provided via the three way valve 70A and pressure control valve 75A will merely help overcome frictional resistance to that pivoting movement.

Controller 78 includes a processor 106, a computer readable memory medium 108, a data base 110 and an input/output module or control panel 112 having a display 114.

The term "computer-readable memory medium" as used herein may refer to any non-transitory medium 108 alone or as one of a plurality of non-transitory memory media 108 within which is embodied a computer program product 116 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The controller 78 receives input data from the sensors 58 and 64. The controller also receives other inputs such as the track speed and magnitude of movement. Based upon the programming 116 the controller 78 can calculate the theoretical pivot angle 28 for each swing leg resulting from any given combination of track speeds, steering inputs to the tracks, and control via the locking mechanisms 40, to each of the four swing legs. The controller 78 may control the magnitude of the pivot angle 28, the speed of the tracks, the magnitude of movement of the tracks and the steering angle 24, for each of the swing legs.

FIG. 8 is a schematic view of the control panel 112. It will be understood that the control panel 112 as shown in FIG. 8 is simplified to show only the controls of interest, and control panel 112 will typically include many controls other than those shown. Also, the control panel 112 may comprise one consolidated control panel for all the controls shown, or those controls may be distributed among two or more control panels. FIG. 9 is a schematic view of the display unit 114 of the control panel 112.

The controller 78 includes a transport re-orientation mode configured to rotate the machine frame 12 in place on the ground through a re-orientation angle, and as the machine frame 12 is rotating, to pivot the swing legs 14 from their operating orientations to their transport orientations relative to the machine frame 12. The transport re-orientation mode may be selected by pressing the control button 126. The transport re-orientation mode may be implemented in either a manual sub-mode or an automatic sub-mode.

Upon initiation of the transport re-orientation mode upon pressing of button 126, the transport re-orientation mode will be in the manual sub-mode, unless the automatic sub-mode is selected by further inputs to the control panel 112.

In the manual sub-mode, the transport re-orientation mode allows the human operator to control the rotation of the machine frame through the re-orientation angle by input to rotational control knob 132, and the various actions of the swing legs and tracks shown in any of the embodiments of FIG. 4A-4U, 5A-5L or 6A-6K are caused to occur by control signals generated by controller 78.

In the automatic sub-mode, the transport re-orientation mode automatically causes the controller 78 to send control signals to carry out the entire process of rotation of the machine frame through the re-orientation angle, and of the various actions of the swing legs and tracks shown in any of the embodiments of FIG. 4A-4U, 5A-5L or 6A-6L. If the human operator observes a problem as the re-orientation process is being performed, the process may be stopped by hitting an emergency stop button 134.

The controller may be pre-programmed to utilize only one of the re-orientation techniques as shown in the embodiments of FIG. 4A-4U, 5A-5L or 6A-6K, or the controller may be programmed to allow the human operator to select one of the embodiments of FIG. 4A-4U, 5A-5L or 6A-6K by additional command inputs to the control panel 112 through the various mode selection buttons M1-M4 and the input controls 136 as best seen in FIG. 9.

It will be appreciated with reference to FIG. 3 that the swing leg 14A cannot reach the full transport position of FIG. 1B with the linear actuator 40A connected at pivot connection 62 as shown in FIG. 3. This is because with the linear actuator 40A connected at connection 62 the swing leg 14A cannot swing through a full 90 degrees without mechanical interference of the linear actuator 40A with the swing leg 14A or the machine frame 12. This can be dealt with in any one of three different ways.

First, the linear actuator 40A may simply be disconnected from connection point 62 so that the swing leg 14A is free to pivot relative to the machine frame 12.

Second, the linear actuator 40A may initially be connected at point 62 as shown in FIG. 3, and then after the swing leg 13A has pivoted counterclockwise relative to machine frame 12 through a portion of its pivot range, the actuator 40A may be disconnected from point 62 and re-connected to optional connection point 63. The linear actuator 40A may then continue to actively facilitate the motion of the swing leg 14A to its full transport position as shown in FIG. 1B.

Figure 3A:
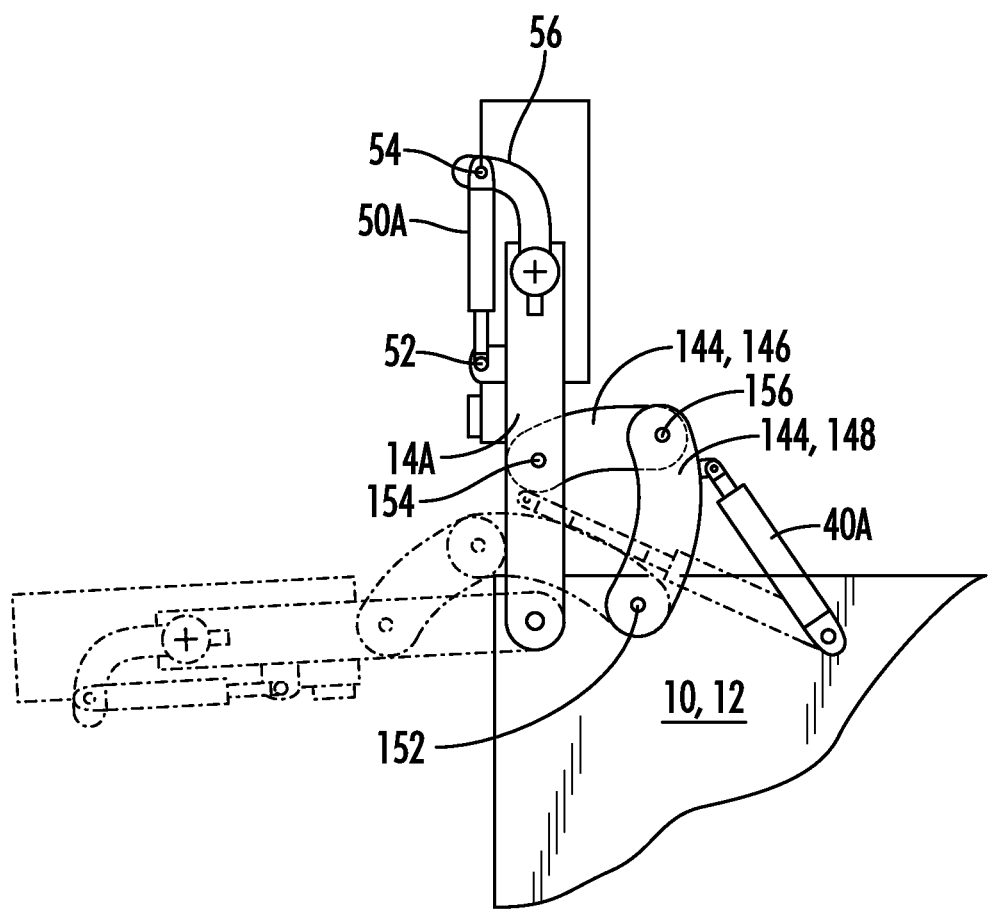
FIG. 3A is a schematic plan view similar to FIG. 3 showing an alternative pivot linkage which can pivot the swing leg through a continuous arc of greater than 90 degrees.

A third alternative is shown in FIG. 3A wherein a linkage 144 made up of links 146 and 148 is connected between machine frame 12 and swing leg 14A. The link 148 is pivotally connected to machine frame 12 at pivot point 152. The link 146 is pivotally connected to swing leg 14A at pivot point 154. The links 146 and 148 are pivotally connected to each other at pivot point 156. In FIG. 3A, the operating or paving positions of the swing leg 14A, the actuator 40A and the linkage 144 relative to machine frame 12 are shown in solid lines. The transport positions of the swing leg 14A, the actuator 40A and the linkage 144 are shown in dashed lines. Through the use of the linkage 144 shown in FIG. 3A, a continuous active facilitation of the pivotal motion of swing leg 14A between the solid line position and the dashed line position can be provided by extension of the piston of the hydraulic cylinder 40A as illustrated.

During any of the re-orientation operations schematically illustrated in FIG. 4A-4U, 5A-5L or 6A-6L, when the swing legs are being pivoted the associated hydraulic rams 40 may be placed in an unblocked position. This unblocked position may be described as deactivating the hydraulic rams or linear actuators, or as unlocking the hydraulic rams, so that the hydraulic rams do not resist the pivotal motion of the associated swing leg relative to the machine frame. For example, in the embodiment of FIG. 7, hydraulic ram 40A may be placed in an unblocked position by closing three way valve 70A and opening the bypass valves 71A and 73A. Alternatively the hydraulic rams or linear actuators 40 may be disconnected.

After the re-orientation operation is complete and the swing legs are in the desired final positions, the associated hydraulic rams 40 may be activated by placing each hydraulic ram in a blocked position to hold or lock the associated swing leg in the revised pivotal position. For example, in the embodiment of FIG. 7, the hydraulic ram 40A may be placed in the blocked position by closing three way valve 70A and closing the bypass valves 71A and 73A. Alternatively, if the hydraulic rams or linear actuators were disconnected, they may be reconnected after the re-orientation operation is complete.

Alternatively, in the embodiment of FIG. 7, during the re-orientation operation the hydraulic ram 40 may be placed in one of the activated positions 88 or 96 to retract or extend the piston 94 so as to actively facilitate the pivotal motion of the associated swing leg relative to the machine frame. To accomplish such active facilitation of the hydraulic ram 40A, the bypass valves 71A and 73A are placed in their closed positions, and the three way valve 70A is moved to either its position 88A or 96A. The flow rate of hydraulic fluid directed to the hydraulic ram 40 may be controlled by the three way valve 70.

The hydraulic ram 40A may be described as a first hydraulic actuator 40A connected between the machine frame 12 and the first swing leg 14A, and configured to change in length as the first swing leg 14A pivots relative to the machine frame 12. The valves associated with the first hydraulic actuator 40A can be switched so that the hydraulic actuator is in a hydraulically blocked position as described above preventing pivoting of the first swing leg 14A or a hydraulically unblocked position as described above permitting pivoting of the first swing leg 14A.

The controller 78 may be configured such that the hydraulic actuator or ram 40 associated with each swing leg 14 to be pivoted is placed in an unblocked position prior to pivoting of the swing leg 14.

The controller 78 may be configured such that upon deactivation of the swing leg pivot mode, the valves associated with the hydraulic actuators or rams 40 are in their blocked positions.

Methods of Operation

Each of the groups of FIGS. 4A-4U, 5A-5L, and 6A-6L illustrate different techniques for driving the ground engaging units 16 to rotate the frame 12 substantially in place on the ground through a re-orientation angle of the frame 12 relative to the ground, and as the frame 12 is rotating, pivoting one or more of the swing legs 14 from a paving position relative to the frame to a transport position relative to the frame.

As noted above, the controller 78 includes in its software 116 a transport re-orientation mode corresponding to each of the embodiments of FIGS. 4A-4U, 5A-5L, and 6A-6L.

Figure 4A:
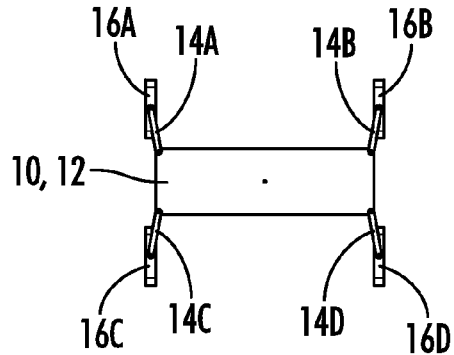
FIGS. 4A-4U are a sequential series of schematic drawings of the construction machine starting in the position of FIG. 1A, and then rotating the frame counter-clockwise through about 90 degrees, as the swing legs are re-oriented one at a time to their transport positions, to reach the orientation of the construction machine swing legs shown in FIG. 1B.
Figure 4D:
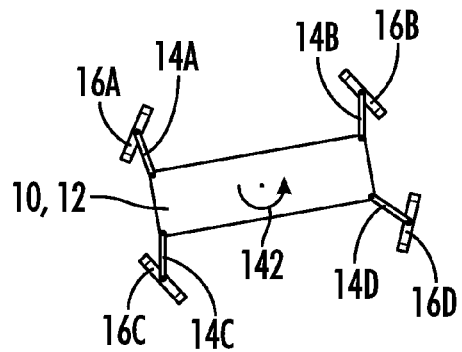
Figure 4B:
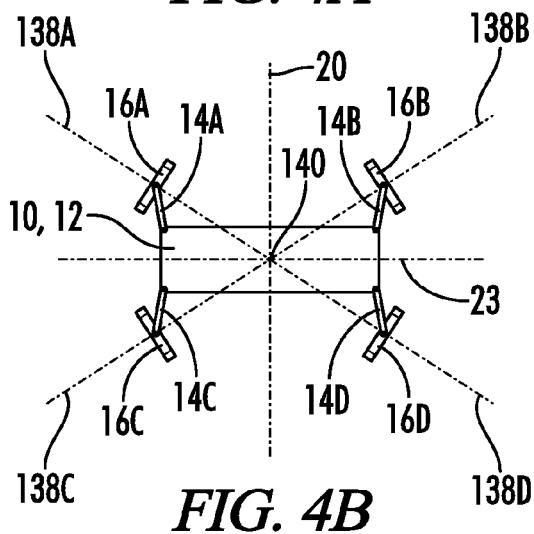
Figure 4E:
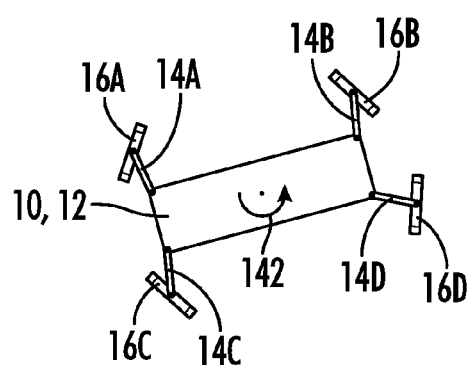
Figure 4C:
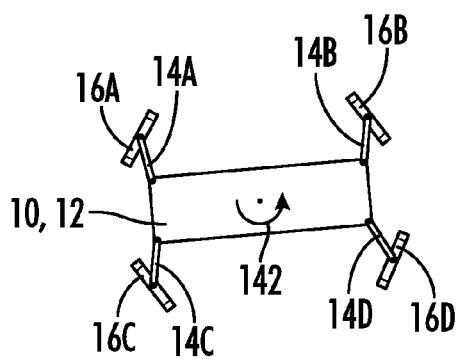
Figure 4F:
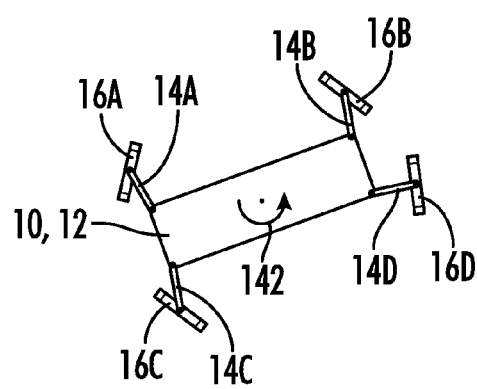
Figure 4G:
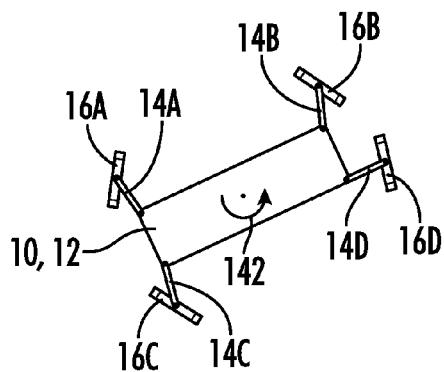
Figure 4J:
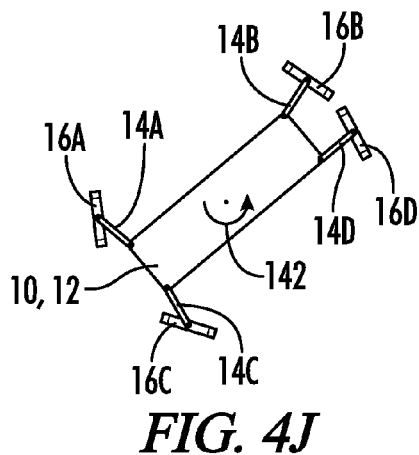
Figure 4H:
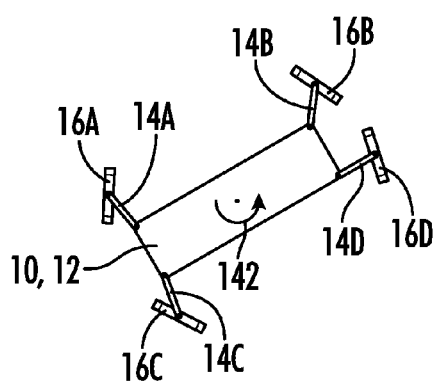
Figure 4K:
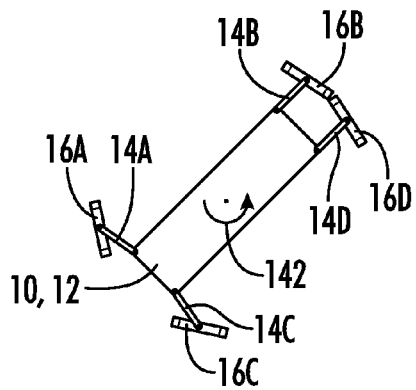
Figure 4I:
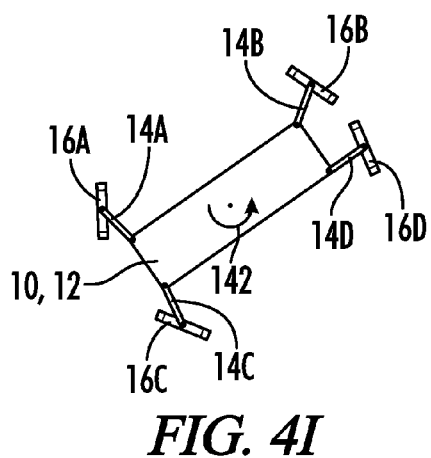
Figure 4L:
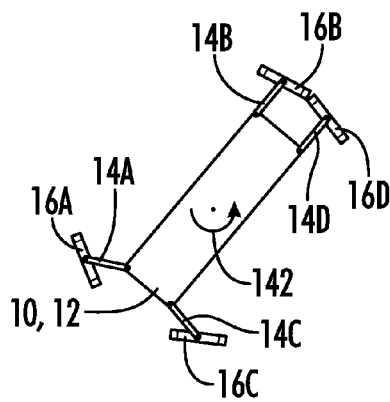
Figure 4M:
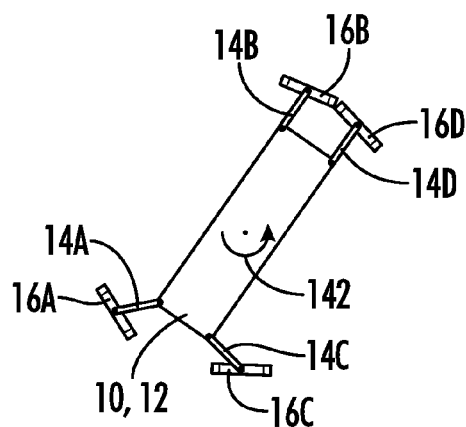
Figure 4P:
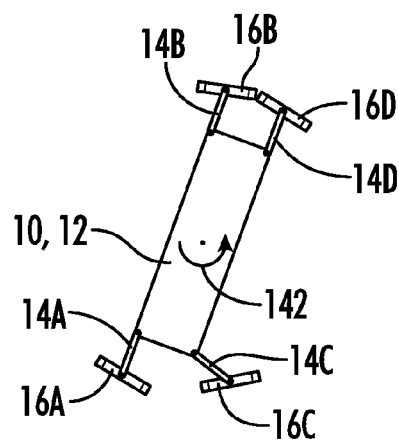
Figure 4N:
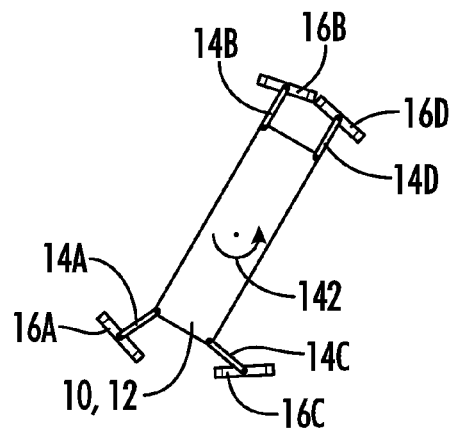
Figure 4Q:
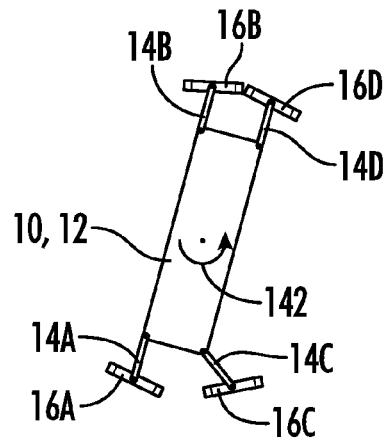
Figure 4O:
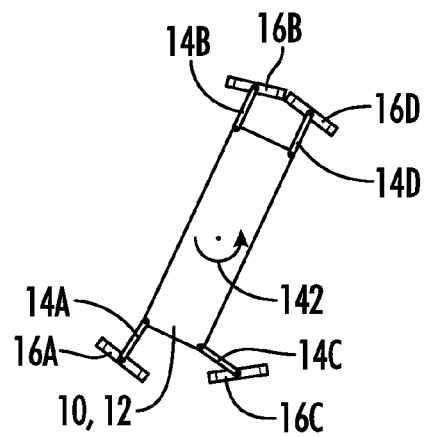
Figure 4R:
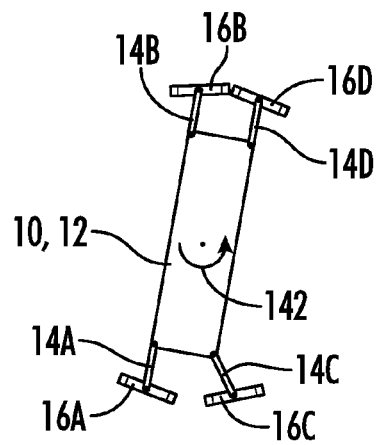
Figure 4S:
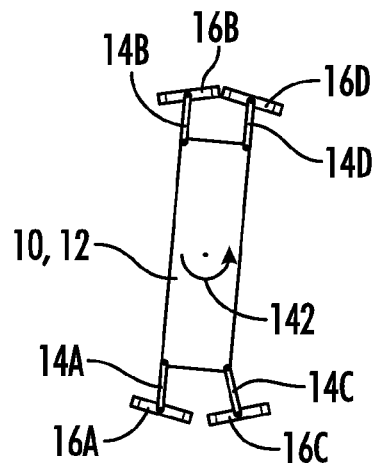
Figure 4T:
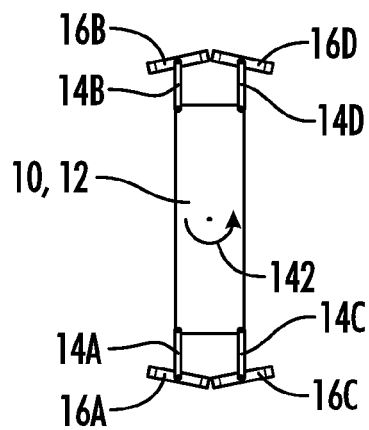
Figure 4U:
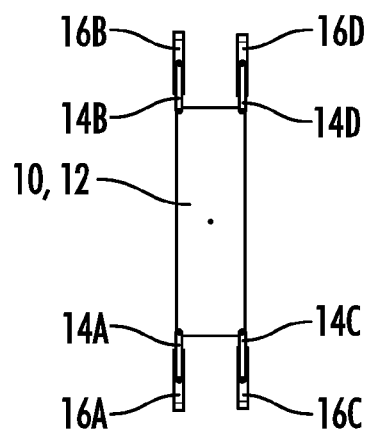

In the embodiment of FIGS. 4A-4U, the transport re-orientation mode is configured to pivot each of the swing legs one at a time in sequence.

In the embodiment of FIGS. 5A-5L, the transport re-orientation mode is configured to pivot the swing legs two at a time in pairs, one pair being the left front and right rear swing legs, and the other pair being the right front and left rear swing legs.

In the embodiment of FIGS. 6A-6L, the transport re-orientation mode is configured to pivot all four swing legs at the same time.

In each of these embodiments, the practical problem being addressed is the need to re-orient the machine frame from its normal operating or paving orientation as shown in FIG. 1A, to a transport orientation as shown in FIG. 1B. This involves both the pivoting of the swing legs from their paving orientation to their transport orientation, and the re-orientation of the frame itself to align the frame with the transport vehicle 25 as schematically represented in FIG. 1B. In the typical field scenario, the paving machine 10 has just finished paving a stretch of road which extends behind the paving machine 10. The existing road which is being paved extends in front of the paving machine 10. The trailer 25 is typically moved into position on the existing road ahead of the paving machine 10, as schematically shown in FIG. 1A. The trailer 25 may be resting on a shoulder of the existing road somewhat to the left or right of the machine 10. It is typically not possible to significantly move the machine 10 laterally (left and right) from its position of FIG. 1A, because of traffic in other lanes and/or because of road shoulders. Therefore it is typically necessary to rotate the machine frame 12 to sufficiently align the machine frame 12 with the transport vehicle 25 so that the machine 10 can be driven onto the transport vehicle 25.

FIGS. 4A-4U, Pivoting One Leg at a Time

In FIG. 4A, the paving machine 10 begins in an orientation similar to that described above with regard to FIG. 1A. This may be described as the operating or paving orientation of the machine 10. The procedure illustrated in FIGS. 4A-4U will move the machine 10 from its paving orientation of FIGS. 1A and 4A through a re-orientation angle of the frame 12 relative to the ground, to a transport orientation similar to FIG. 1B. As the frame is rotating, each of the swing legs 14 will be pivoted one at a time in sequence from a paving position relative to the frame to a transport position relative to the frame.

From the operating position of FIG. 4A, each of the ground engaging units 16 is first steered such that a drive axis 138 of each of the ground engaging units 16 intersects approximately at a common point 140 defining a center of rotation of the frame 12. As seen in FIG. 4B, the center of rotation 140 lies substantially on the longitudinal center line or longitudinal axis 20 of the frame 12. It will be appreciated that if the swing legs 14 were held fixed relative to the frame 12, and the ground engaging units 16 were all advanced in the same rotational direction at the same speed, the machine 10 would rotate in place about center of rotation 140. In FIGS. 4A-4U this rotation is in a counterclockwise direction as indicated by the arrow 142 in FIG. 4C.

Preferably, the initial steering of each of the ground engaging units 16 to the orientation of FIG. 4B involves steering each of the ground engaging units through a steering angle of about 30 degrees relative to its respective swing leg. This may also be described as a steering angle of not greater than 45 degrees.

By controlling the relative speeds and/or the relative steering angles of the ground engaging units 16A-16D relative to each other, and/or by controlling the linear actuators 40, one or more of the swing legs 14 may be caused to pivot relative to the machine frame 12 as the machine frame 12 rotates. In FIGS. 4C-4G, the right rear ground engaging unit 16D is operating at a higher speed than the other ground engaging units, and the linear actuator 40D of right rear swing leg 14D allows swing leg 14D to pivot, thus causing the right rear swing leg 14D to begin pivoting relative to the machine frame 12 simultaneously with the rotational movement of the machine frame 12 relative to the ground surface.

That pivotal movement of the right rear swing leg 14D relative to the machine frame 12 continues through the positions of FIGS. 4D-4F until the right rear swing leg 14D is substantially in its transport position relative to the machine frame 12 as seen in FIG. 4G.

It is noted that as the right rear swing leg 14D is pivoted toward its transport position relative to the machine frame 12 the steering angle of its ground engaging unit 16D relative to the swing leg 14D increases from the position of FIG. 4B to the position of FIG. 4G.

The controller 78 can be programmed to take into account all of the inputs acting on each swing leg 14, including the input from the advancing of the ground engaging unit 16 as resolved according to its steering angle, and other inputs such as from the linear actuator 40 and the relative motion of the machine frame 12, in order to calculate the appropriate inputs of advance speed and steering angle to achieve the desired pivoting motion of each swing leg and the desired rotational re-orientation of the machine frame 12.

Then, the speed of the right front ground engaging unit 16B is slowed down relative to the other ground engaging units so that in the positions of FIGS. 4H through 4K, the right front swing leg 14B will pivot clockwise relative to machine frame 12 to its transport position as seen in FIG. 4K.

The process continues in FIG. 4L by next accelerating the speed of left front ground engaging unit 16A relative to the other ground engaging units until the left front swing leg 14A reaches its transport position as seen in FIG. 4P. Finally the advance speed of the left rear ground engaging unit 16C is slowed down relative to the other ground engaging units until the left rear swing leg 14C pivots to its transport position as seen in FIG. 4T. At that point, the machine frame 12 has pivoted through a re-orientation angle of approximately 90 degrees so that the machine frame 12 is in substantially the position as seen in FIG. 1B. Each of the ground engaging units 16 is then be steered back to an orientation as seen in FIG. 4U and FIG. 1B substantially aligned with the long dimension 21 of the machine frame 12, so that the machine 10 can then drive onto the trailer 25 as schematically illustrated in dashed lines in FIG. 1B.

FIGS. 5A-5L, Pivoting Two Swing Legs at a Time

Figure 5A:
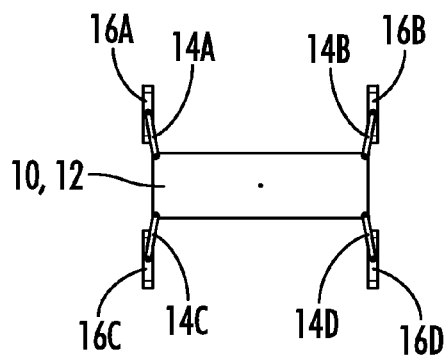
FIGS. 5A-5L are a sequential series of schematic drawings of the construction machine starting in the position of FIG. 1A, and then rotating the frame counter-clockwise through about 90 degrees, as the swing legs are re-oriented two at a time to their transport positions as seen in FIG. 1B.
Figure 5D:
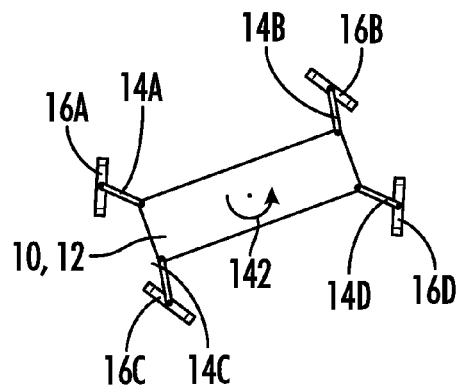

Referring now to FIG. 5A, the machine frame 12 and the pivot legs 14 and ground engaging units 16 again begin in an operating position substantially the same as that described above with regard to FIGS. 1A and 4A.

Figure 5B:
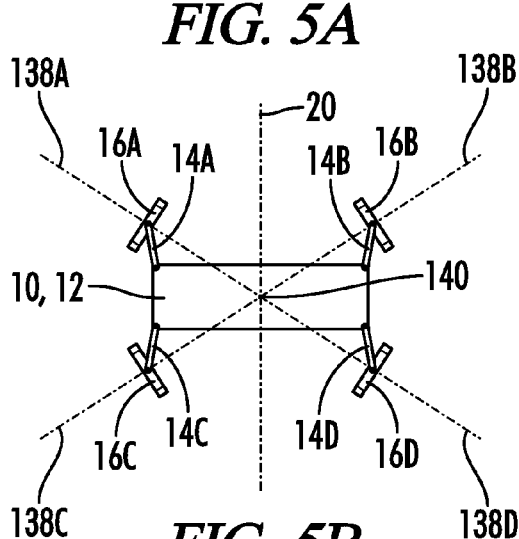
Figure 5E:
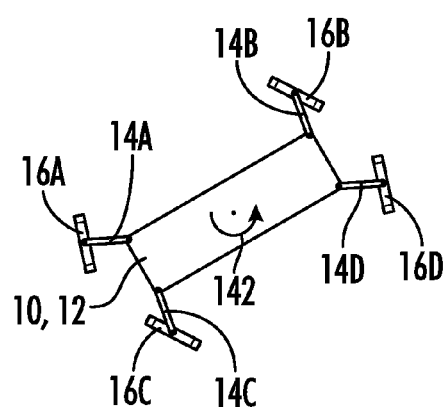
Figure 5C:
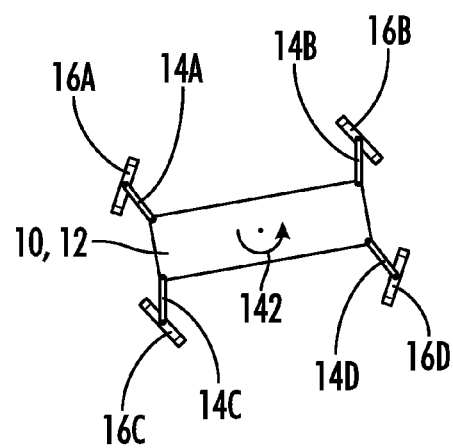
Figure 5F:
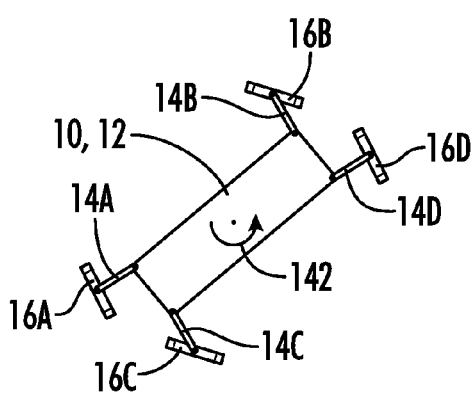
Figure 5G:
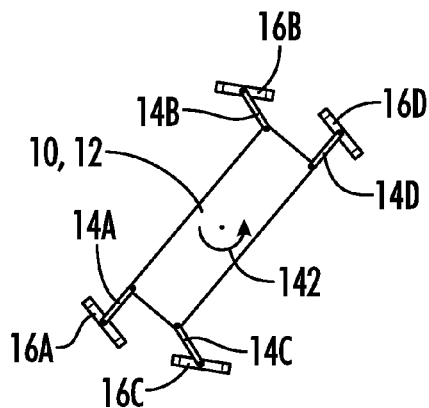
Figure 5J:
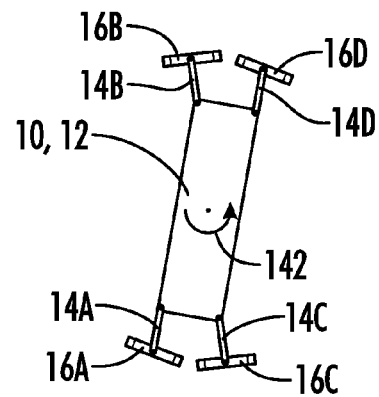

Then again in FIG. 5B, the ground engaging units 16 are initially steered to a position similar to that described above with regard to FIG. 4B.

Figure 5H:
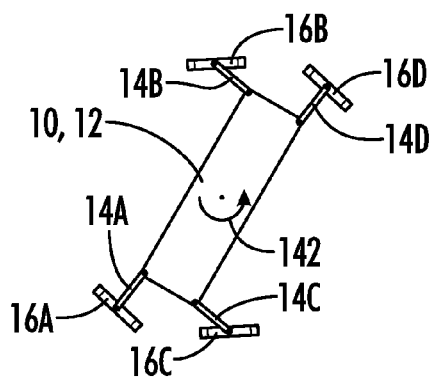

Then, the ground engaging units 16 may begin advancing so as to begin rotating the frame 12 counterclockwise as indicated by arrow 142. In this embodiment, the left front ground engaging unit 16A and the right rear ground engaging unit 16D initially operate at a faster speed than do the ground engaging units 16B and 16C, so that as the machine frame 12 rotates through the positions of FIGS. 5C-5H, the left front swing leg 14A and right rear swing leg 14D each pivot counterclockwise relative to frame 12 to their transport positions relative to frame 12 as seen in FIG. 5H. It is noted that the linear actuators 40 associated with swing legs 14A and 14D must be arranged to permit this pivoting movement.

Figure 5K:
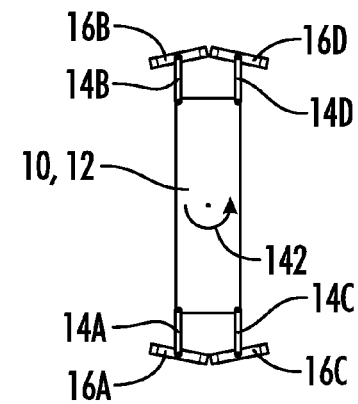
Figure 5I:
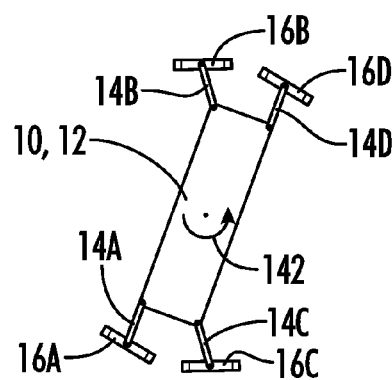

Then the right front swing leg 14B and left rear swing leg 14C must be made free to pivot, and with the right front ground engaging unit 16B and the left rear ground engaging unit 16C advancing slower than the left front ground engaging unit 16A and right rear ground engaging unit 16D, the right front swing leg 14B and left rear swing leg 14C pivot clockwise relative to the machine frame 12 to their transport positions as seen in FIG. 5K. It is noted that in FIG. 5K, the machine frame 12 has rotated through a re-orientation angle of approximately 90 degrees relative to the ground, between the positions of FIGS. 5A and 5K.

Figure 5L:
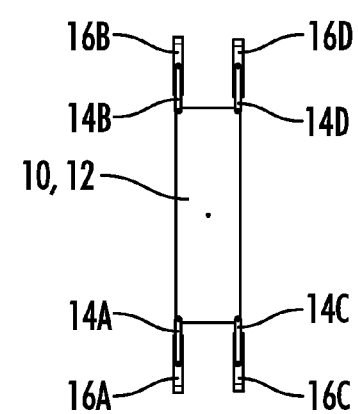

Then, comparing FIG. 5K to FIG. 5L, it is noted that the ground engaging units 16 have been steered to an orientation generally parallel to the long dimension 21 of frame 12 corresponding to the position of FIG. 1B, wherein the machine 10 is ready to drive on the trailer 25.

FIGS. 6A-6L, Pivoting all Four Legs Simultaneously

FIG. 6A again shows the machine 10 in the same orientation as FIG. 4A and FIG. 1A, with the swing legs 14 and the ground engaging units 16 in their operating or paving position. And again in FIG. 6B, the ground engaging units 16 have been steered to an orientation like that described above with regard to FIG. 4B.

Figure 6A:
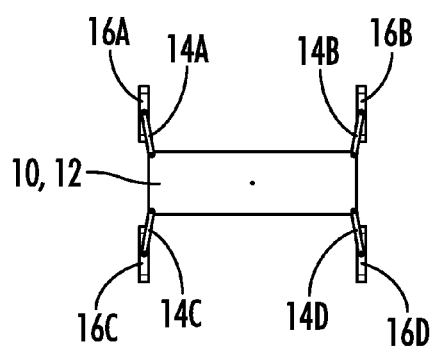
FIGS. 6A-6L are a sequential series of schematic drawings of the construction machine starting in the position of FIG. 1A, and then rotating the frame counter-clockwise through about 90 degrees, as the swing legs are re-oriented all four at the same time to their transport positions as seen in FIG. 1B.
Figure 6D:
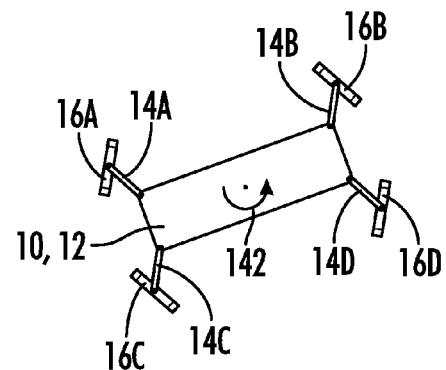
Figure 6B:
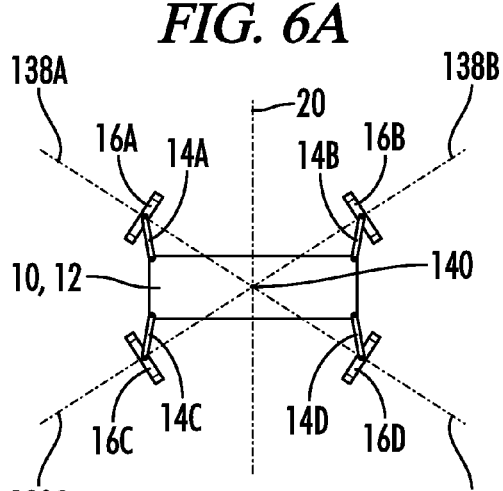
Figure 6E:
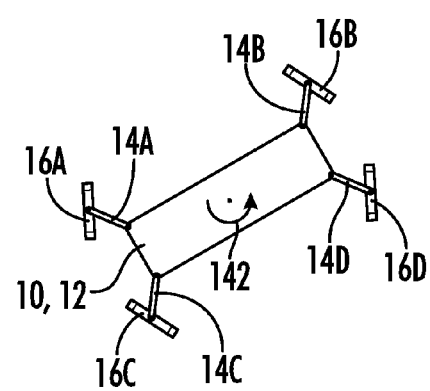
Figure 6C:
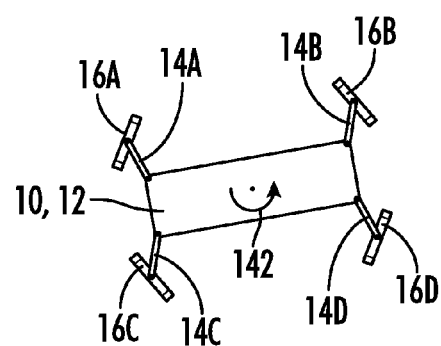
Figure 6F:
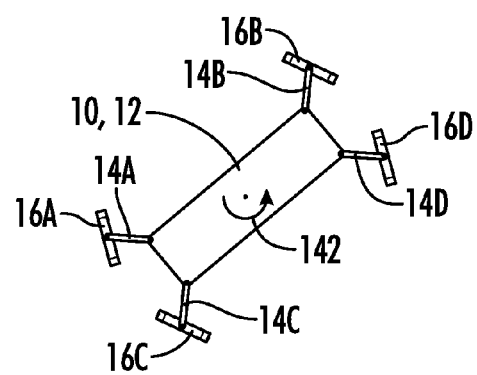
Figure 6G:
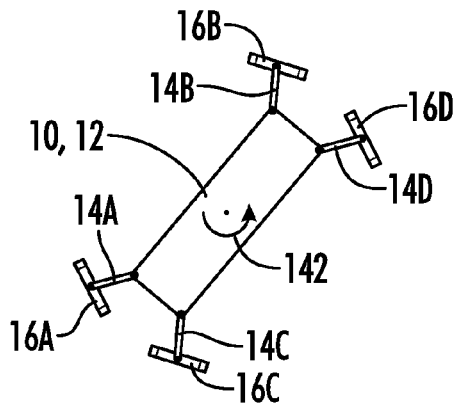
Figure 6J:
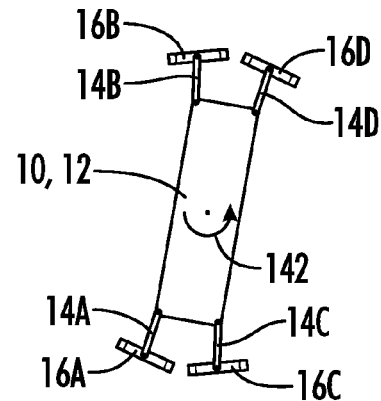
Figure 6H:
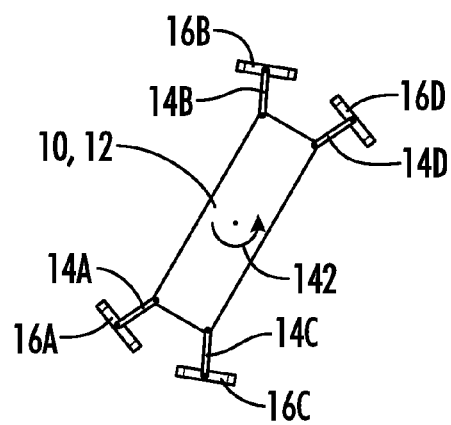
Figure 6K:
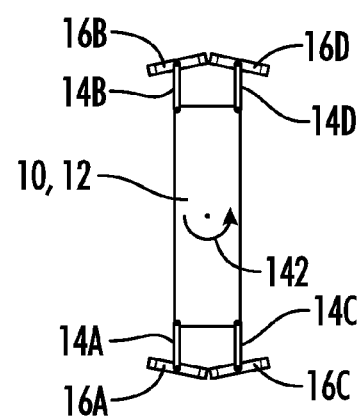
Figure 6I:
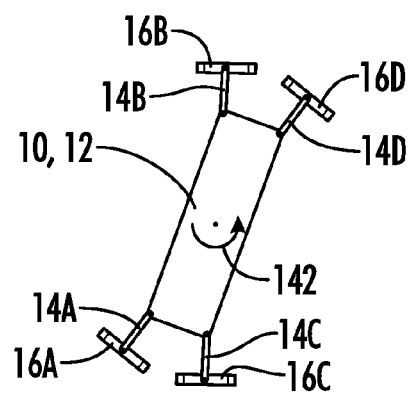

The sequence from FIG. 6B through FIG. 6K illustrates the rotation of the machine frame 12 through a re-orientation angle of approximately 90 degrees and the simultaneous pivoting of all of the swing legs 14A-14D from their operating or paving positions of FIG. 6B to their transport positions of FIG. 6K relative to the machine frame 12. This movement may be achieved by imparting the appropriate steering angle, and/or control via actuators 40, to each of the ground engaging units 16, and the appropriate advance speed to each of the ground engaging units, so as to cause the pivoting of each swing leg 14 relative to the machine frame 12 during the rotation of the machine frame.

Figure 6L:
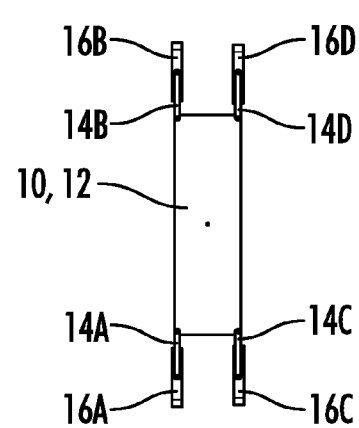

Then, after the machine frame 12 has reached the position of FIG. 6K, the ground engaging units 16 are steered to the orientation of FIG. 6L wherein each of the ground engaging units is generally aligned with the long dimension 21 of the machine frame 12 so that the paving machine 10 is in the orientation of FIG. 1B and is ready to be driven on the trailer 25.

Variations on the Illustrated Modes

It is noted that although in the modes of FIGS. 4A-4U and 5A-5L, the relative motion of the swing legs relative to the machine frame 12 was described as being achieved by varying the relative advance speed of the ground engaging units 16 relative to each other, similar variations in pivoting motion of the swing legs relative to the machine frame and relative to each other may be achieved by steering the ground engaging units differently relative to their respective swing legs, and/or by a combination of variations in advance speed and steering of each swing leg. Also the status of the linear actuators 40 as being locked or unlocked, or in an active facilitation mode, affects the resulting pivotal motion of the swing legs 14.

Although three general schemes involving pivoting one leg at a time, two legs at a time, and all four legs at the same time have been illustrated with regard to the embodiments of FIGS. 4A-4U, 5A-5L, and 6A-6K, respectively, other modes may be created as desired.

Also, although each of the modes illustrated in FIGS. 4A-4U, 5A-5L, and 6A-6L shows re-orientation through an angle of substantially 90 degrees, it will be appreciated that a similar result can be achieved by re-orientation through any odd multiple of 90 degrees, e.g. 90 degrees or 270 degrees or 450 degrees, etc.

Also, although each of the examples illustrated in FIGS. 4A-4U, 5A-5L, and 6A-6L shows re-orientation wherein the frame rotates in only one rotational direction, similar results can be obtained by first rotating the frame in one rotational direction and then rotating the frame in the opposite rotational direction. For example, in the embodiment where only one swing leg is pivoted at a time, the re-orientation angle associated with pivoting of the first swing leg could be 45 degrees, then the re-orientation angle associated with pivoting of the second swing leg could be 45 degrees (now 45+45=90), then the re-orientation angle associated with pivoting of the third swing leg could be 45 degrees (now 45+45+45=135 degrees), and then the final swing leg could be pivoted while rotating the frame in the opposite direction through a re-orientation angle of −45 degrees, so that the combined re-orientation angle is 45+45+45−45=90 degrees.

In general, all of the modes described above can be described as involving methods comprising the steps of:
(a) driving the ground engaging units to rotate the frame substantially in place on the ground through a re-orientation angle of the frame relative to the ground; and;
(b) as the frame is rotating, pivoting one or more of the swing legs from a paving position relative to the frame, to a transport position relative to the frame.

Similarly, the controller utilized in all of the methods can be generally described as including a transport re-orientation mode configured to rotate the machine frame substantially in place on the ground through a re-orientation angle, and as the machine frame is rotating to pivot the swing legs from an operating orientation to a transport orientation relative to the machine frame.

It will be appreciated that when the machine frame 12 is described as rotating "in place" or "substantially in place" on the ground through a re-orientation angle, it is not required that some center point, such as point 140 in FIG. 4B, remain exactly fixed relative to the ground during the rotation. That would be impossible to achieve in real life. From the practical standpoint what is important is that the paving machine 10 be able to rotate through a re-orientation angle of approximately 90 degrees within the typical available space on a construction site where a portion of a roadway is being paved. In general, rotating "in place" or "substantially in place" can be considered to be achieved if a geometrical center point or centroid of the area of the paving machine 10 (such as point 140) remains within an original footprint occupied by the paving machine 10 at the beginning of the rotational operation.

Although in each of the embodiments above, the re-orientation angle has been described as being substantially 90 degrees, or substantially an odd multiple of 90 degrees, it will be appreciated that in general it is not necessary to rotate the machine frame through a re-orientation angle of exactly 90 degrees. So long as the machine frame is rotated through a sufficient angle that it can then drive perhaps in a curved path if not an exactly straight path, onto the transport vehicle 25, the same result is achieved. In general, the re-orientation angle is preferably in a range of plus or minus 30 degrees from an odd multiple of 90 degrees. More preferably the re-orientation angle is in a range of plus or minus 10 degrees from an odd multiple of 90 degrees.

Also, it will be appreciated that although each of the swing legs 14 is shown as pivoting through an angle of approximately 90 degrees from its operating position of FIG. 1A to its transport position of FIG. 1B, that pivot angle also does not have to be exactly 90 degrees. In general, the pivot angle between the operating position and the transport position for each swing leg may be described as being at least about 80 degrees relative to the paving direction. It is also possible for the pivot angle of each swing leg to be greater than 90 degrees. For example, it is sometimes desired to angle the swing legs 14A and 14C toward each other when they are in their final position like that of FIG. 5L, so as to narrow the distance between the outer edges of the ground engaging units once they are in their transport position.

Figure 11A:
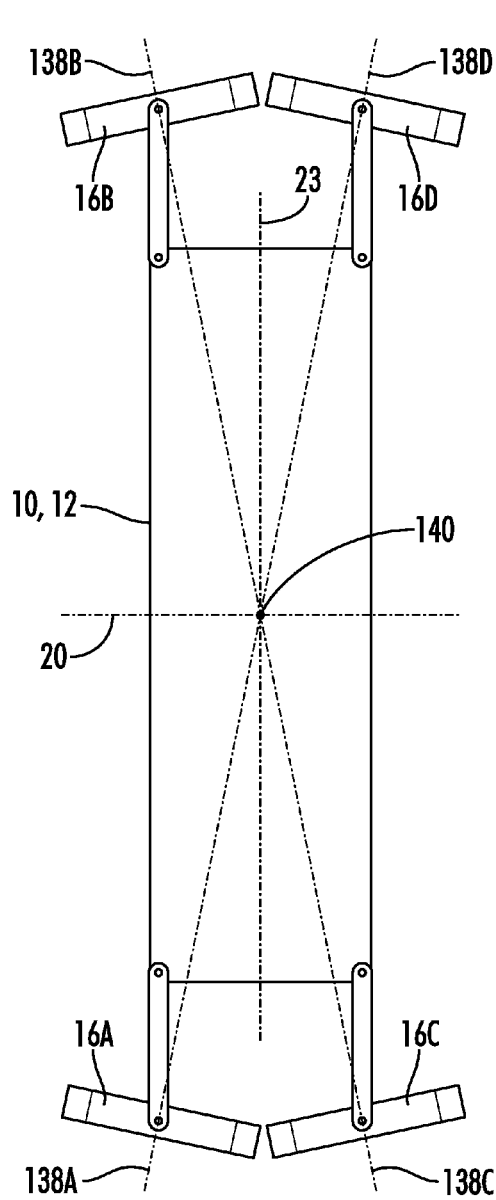
FIG. 11A is a schematic illustration showing possible crawler track interference if a center of rotation of the frame is centrally located on the frame.
Figure 11B:
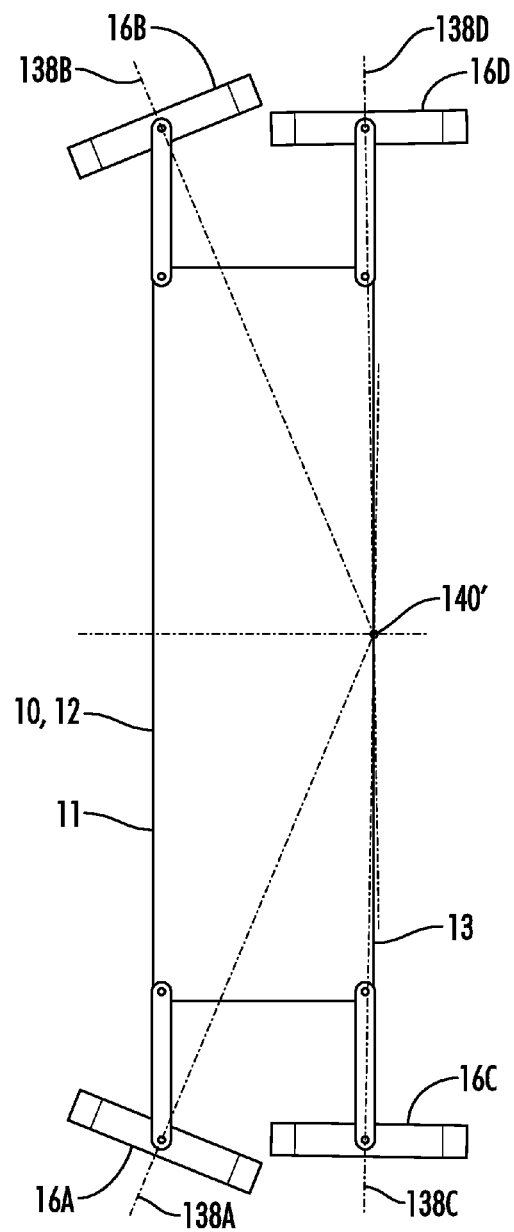
FIG. 11B is a schematic illustration similar to FIG. 11A, but showing improved crawler track clearance if the center of rotation of the frame is offset to the rear of the frame.

FIGS. 11A and 11B illustrate another alternative modification of the examples described above. FIG. 11A shows the machine frame 12 having been rotated about center of rotation 140 through a re-orientation angle of about 90 degrees to a position like that shown in FIG. 4T. The center of rotation 140 may be described as lying substantially on the longitudinal centerline 20, and also substantially on a lateral centerline 23 lying substantially mid-way between the front and rear 11 and 13 of machine frame 12. It is noted that depending on the dimensions of the frame and of the crawler tracks 16, it is possible that left front track 16A may interfere with left rear track 16C, and right front track 16B may interfere with right rear track 16D.

FIG. 11B shows an alternative arrangement wherein the tracks 16 have been oriented so as to rotate the frame 12 about an offset center of rotation 140' which in this case is offset to approximately the rear 13 of the machine frame 12. With this orientation of the tracks it is seen that the left front track 16A does not interfere with the left rear track 16C, and the right front track 16B does not interfere with the right rear track 16D. In this embodiment the center of rotation 140' may be described as being substantially offset from the lateral centerline 23.

The pivoting of the swing legs relative to the machine frame may be described as being performed at least in part by controlling a differential speed of the ground engaging units 16 relative to each other.

Also, the pivoting of the swing legs relative to the machine frame may be described as being performed at least in part by steering the ground engaging units at different steering angles relative to their respective swing legs.

Additional control over the pivoting motion of the swing legs may be performed at least in part by selectively fixing or releasing a pivotal connection between each swing leg and the machine frame.

Further control of the pivoting of the swing legs relative to the machine frame, during rotation of the machine frame may be performed at least in part by actively facilitating or blocking the pivoting motion of the swing legs through the use of the linear actuators 40 associated with each swing leg.

All of these various techniques for achieving relative pivotal motion of the swing legs relative to the machine frame as the machine frame is rotating in place on the ground, and any combination of those techniques can be performed under the control of the automatic controller 78 in accordance with a set of preprogrammed operating instructions which may be stored in software 116.

Thus it is seen that the apparatus and methods of the present invention readily achieve the ends and advantages mentioned as well as those inherent therein. Although certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A construction machine, comprising:
a machine frame;
first, second, third, and fourth swing legs pivotally connected to the machine frame;
first, second, third, and fourth ground engaging units steerably connected to the first, second, third, and fourth swing legs, respectively, the ground engaging units including drive motors configured such that the ground engaging units are driven across a ground surface by the drive motors;
first, second, third, and fourth steering sensors configured to detect steering angles of the first, second, third, and fourth ground engaging units relative to the first, second, third, and fourth swing legs, respectively;
first, second, third, and fourth pivot sensors configured to detect pivot angles of the first, second, third, and fourth swing legs, respectively, relative to the machine frame;
first, second, third, and fourth locks configured to selectively lock and unlock the first, second, third, and fourth swing legs, respectively, in pivotal position relative to the machine frame; and
a controller including a transport re-orientation mode configured to rotate the machine frame substantially in place on the ground through a re-orientation angle, and as the machine frame is rotating to pivot the swing legs from an operating orientation to a transport orientation relative to the machine frame.

2. The machine of claim 1, wherein:
the transport re-orientation mode is configured to pivot each of the swing legs one at a time in sequence.

3. The machine of claim 1, wherein:
the transport re-orientation mode is configured to pivot the swing legs two at a time in pairs, one pair being the left front and right rear swing legs, and another pair being the right front and left rear swing legs.

4. The machine of claim 1, wherein:
the transport re-orientation mode is configured to pivot all four swing legs at the same time.

5. The machine of claim 1, wherein the re-orientation angle is in a range of plus or minus 30° about an odd multiple of 90°.

6. The machine of claim 1, wherein the re-orientation angle is in a range of plus or minus 10° about an odd multiple of 90°.

7. The machine of claim 1, wherein the re-orientation angle is substantially an odd multiple of 90°.

8. The machine of claim 1, wherein the transport re-orientation mode is configured such that the machine frame is rotated in only one rotational direction as the machine frame is rotated through the re-orientation angle.

9. The machine of claim 1, wherein the transport re-orientation mode is configured such that the machine frame is rotated first in one rotational direction and then in an opposite rotational direction as the machine frame is rotated through the re-orientation angle.

10. The machine of claim 1, wherein:
the transport re-orientation mode is configured to, prior to pivoting the swing legs, steer each of the ground engaging units such that a drive axis of each of the ground engaging units intersects at substantially a common point defining a center of rotation of the frame.

11. The machine of claim 10, wherein:
the center of rotation lies substantially on a center line of the frame mid-way between left and right sides of the frame.

12. The machine of claim 10, wherein:
the machine frame includes a front and a rear; and
the center of rotation lies substantially on a lateral center line of the frame, the lateral centerline being substantially mid-way between front and rear of the machine frame.

13. The machine of claim 10, wherein:
the machine frame includes a front and a rear; and
the center of rotation lies substantially offset from a lateral centerline of the frame, the lateral centerline being substantially mid-way between front and rear of the machine frame.

14. The machine of claim 1, wherein:
the transport re-orientation mode is configured to pivot the swing legs at least in part by controlling relative speeds of the ground engaging units relative to each other.

15. The machine of claim 1, wherein:
the transport re-orientation mode is configured to pivot the swing legs at least in part by controlling the steering angles of the ground engaging units to steer the ground engaging units at different steering angles relative to each other.

16. The machine of claim 1, wherein:
the transport re-orientation mode is configured to pivot the swing legs at least in part by controlling the locks to selectively unlock each swing leg to allow the swing leg to pivot.

17. The machine of claim 1, wherein:
the locks each include a hydraulic control system connected between the machine frame and the respective swing leg, and configured to change in length as the respective swing leg pivots relative to the machine frame, the hydraulic control system having a hydraulically blocked position preventing pivoting of the respective swing leg and a hydraulically un-blocked position permitting pivoting of the respective swing leg.

18. The machine of claim 17, wherein:
the transport re-orientation mode is configured such that the hydraulic control system associated with each swing leg to be pivoted is moved to the un-blocked position.

19. The machine of claim 17, wherein the each hydraulic control system includes:
a hydraulic ram having a piston and a cylinder, the piston dividing the cylinder into first and second ends;
a three way valve having an extension position, a retraction position, and a blocked position;
a first line and a second line connecting the three way valve to the first and second ends of the cylinder; and
wherein in the hydraulically blocked position of the hydraulic control system, the three way valve is in its blocked position.

20. The machine of claim 19, wherein:
the hydraulic control system further includes first and second bypass valves connected to the first and second lines, respectively, each bypass valve including a blocked position and a bypass position, the bypass position communicating the respective line to a fluid reservoir;
in the hydraulically blocked position of the hydraulic control system, the first and second bypass valves are in their respective blocked positions; and
in a first hydraulically un-blocked position of the first hydraulic control system, the three way valve is in its blocked position and the first and second bypass valves are in their bypass positions; and
in a second hydraulically un-blocked position of the hydraulic control system, the first and second bypass valves are in their blocked positions and the three way valve is in either its extension or retraction position, and the controller is configured such that the first hydraulic ram actively facilitates the pivoting of the respective swing leg.

21. The machine of claim 19, wherein:
in the hydraulically un-blocked position of the hydraulic control system, the three way valve is in either its extension or retraction position, and the controller is configured such that the hydraulic ram actively facilitates the pivoting of the respective swing leg.

22. The machine of claim 21, wherein:
the controller is further configured such that the controller determines a degree of active facilitation of the pivoting in accordance with an algorithm.

23. The machine of claim 21, wherein:
the hydraulic control system further includes a supply line and a pressure control valve located in the supply line; and
the controller is further configured such that the active facilitation of the pivoting of the respective swing leg by the hydraulic ram is limited to providing a hydraulic pressure to the hydraulic ram controlled by the pressure control valve.

24. The machine of claim 17, wherein hydraulic control system includes:
a hydraulic ram having a piston and a cylinder, the piston dividing the cylinder into first and second ends;
first and second hydraulic lines connecting a fluid reservoir to the first and second ends of the cylinder, respectively; and
first and second bypass valves connected to the first and second hydraulic lines, respectively, each bypass valve including a blocked position and a bypass position, the bypass position communicating the respective end of the hydraulic ram to the fluid reservoir; and
wherein in the hydraulically blocked position of the hydraulic control system the first and second bypass valves are in the blocked positions; and
wherein in the hydraulically un-blocked position of the hydraulic control system the first and second bypass valves are in their bypass positions.

25. The machine of claim 1, wherein the machine is a slipform paving machine.

26. The machine of claim 1, wherein the ground engaging units comprise crawler tracks.

\* \* \* \* \*